United States Patent
Matsuda et al.

(10) Patent No.: US 9,834,725 B2
(45) Date of Patent: *Dec. 5, 2017

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Naoko Matsuda, Chiba (JP); Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/180,077

(22) Filed: Jun. 12, 2016

(65) Prior Publication Data

US 2017/0044435 A1    Feb. 16, 2017

(30) Foreign Application Priority Data

Aug. 10, 2015 (JP) ................. 2015-157945

(51) Int. Cl.

| | | |
|---|---|---|
| G02F 1/1333 | (2006.01) |
| C09K 19/34 | (2006.01) |
| C09K 19/30 | (2006.01) |
| C09K 19/14 | (2006.01) |
| C09K 19/32 | (2006.01) |
| C09K 19/54 | (2006.01) |
| C09K 19/04 | (2006.01) |
| C09K 19/12 | (2006.01) |
| G02F 1/137 | (2006.01) |

(52) U.S. Cl.
CPC .......... *C09K 19/3402* (2013.01); *C09K 19/14* (2013.01); *C09K 19/3003* (2013.01); *C09K 19/3066* (2013.01); *C09K 19/3068* (2013.01); *C09K 19/3098* (2013.01); *C09K 19/322* (2013.01); *C09K 2019/0444* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3025* (2013.01); *C09K 2019/3071* (2013.01); *C09K 2019/3078* (2013.01); *C09K 2019/3422* (2013.01); *C09K 2019/3425* (2013.01); *C09K 2019/548* (2013.01); *G02F 1/133365* (2013.01); *G02F 2001/13712* (2013.01)

(58) Field of Classification Search
CPC ........... C09K 19/3402; C09K 19/3066; C09K 19/3098; C09K 19/3003; C09K 19/3068; C09K 19/14; C09K 19/322; C09K 2019/3422; C09K 2019/3004; C09K 2019/3009; C09K 2019/301; C09K 2019/3016; C09K 2019/3021; C09K 2019/3071; C09K 2019/3425; C09K 2019/3078; C09K 2019/548; C09K 2019/0444; C09K 2019/0448; C09K 2019/122; C09K 2019/123; C09K 2019/3015; C09K 2019/3025; G02F 1/1333; G02F 1/133365; G02F 2001/13712
USPC ................. 252/299.01, 299.61; 428/1.1
See application file for complete search history.

(56) References Cited

U.S. PATENT DOCUMENTS

| | | | |
|---|---|---|---|
| 7,618,554 B2 * | 11/2009 | Irisawa .............. | C09K 19/0403 252/299.61 |
| 2016/0362605 A1 * | 12/2016 | Takata ................... | C09K 19/20 |
| 2017/0051205 A1 * | 2/2017 | Matsuda ............ | C09K 19/3402 |

FOREIGN PATENT DOCUMENTS

DE    4223501    1/1994

* cited by examiner

*Primary Examiner* — Geraldina Visconti
(74) *Attorney, Agent, or Firm* — JCIPRNET

(57) ABSTRACT

To show a liquid-crystal composition having at least one or a suitable balance regarding at least two of characteristics such as a high maximum temperature of a nematic phase, a low minimum temperature thereof, small viscosity, suitable optical anisotropy, large negative dielectric anisotropy, large specific resistance, high stability to ultraviolet light and heat; and an AM device including the composition and having short response time, a large voltage holding ratio, low threshold voltage, a large contrast ratio or a long service life. The liquid-crystal composition has negative dielectric anisotropy and contains a specific compound having a high maximum temperature and small viscosity as a first component, and the composition may contain a specific compound having large negative dielectric anisotropy as a second component, a specific compound having a high maximum temperature or small viscosity as a third component, and a specific compound having a polymerizable group as an additive component.

18 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2015-157945, filed on Aug. 10, 2015. The entirety of the above-mentioned patent application is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having a negative dielectric anisotropy, and a liquid crystal display device that includes the composition and has a mode such as an IPS mode, a VA mode, an FFS mode and an FPA mode. The invention also relates to a liquid crystal display device having a polymer sustained alignment mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is approximately 70° C. or higher, and a preferred minimum temperature of The nematic phase is approximately −10° C. or lower. Viscosity of the liquid crystal composition relates to a response time of the device. A short response time is preferred for displaying moving images on the device. A shorter response time even by one millisecond is desirable. Accordingly, a small viscosity of the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

An optical anisotropy of the composition relates to a contrast ratio in the device. According to a mode of the device, a large optical anisotropy or a small optical anisotropy, more specifically, a suitable optical anisotropy is required. A product (Δn×d) of the optical anisotropy (Δn) of the composition and a cell gap (d) in the device is designed so as to maximize the contrast ratio. A suitable value of the product depends on a type of the operating mode. The suitable value is in the range of approximately 0.30 micrometer to approximately 0.40 micrometer in a device having the VA mode, and is in the range of approximately 0.20 micrometer to approximately 0.30 micrometer in a device having the IPS mode or the FFS mode. In the above cases, a composition having the large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and the large contrast ratio in the device. Accordingly, a composition having the large specific resistance at room temperature and also at a high temperature in an initial stage is preferred. The composition having the large specific resistance at room temperature and also at a high temperature after the device has been used for a long period of time is preferred. Stability of the composition to ultraviolet light and heat relates to a service life of the device. In the case where the stability is high, the device has a long service life. Such characteristics are preferred for an AM device used in a liquid crystal projector, a liquid crystal television and so forth.

In a liquid crystal display device having a polymer sustained alignment (PSA) mode, a liquid crystal composition containing a polymer is used. First, a composition to which a small amount of a polymerizable compound is added is injected into the device. Then, the composition is irradiated with ultraviolet light while voltage is applied between substrates of the device. The polymerizable compound is polymerized to form a network structure of the polymer in the liquid crystal composition. In the composition, alignment of liquid crystal molecules can be controlled by the polymer, and therefore the response time of the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having a positive dielectric anisotropy is used in an AM device having the TN mode. In an AM device having the VA mode, a composition having a negative dielectric anisotropy is used. A composition having the positive or negative dielectric anisotropy is used in an AM device having the IPS mode or the FFS mode. In an AM device having the polymer sustained alignment (PSA) mode, a composition having the positive or negative dielectric anisotropy is used. A compound contained in a first component of the invention is disclosed in Patent literature No. 1 described below.

CITATION LIST

Patent Literature

Patent literature No. 1: DE 4223501 A.

SUMMARY OF INVENTION

Technical Problem

One of aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics. Another aim is to provide a liquid crystal display device including such a composition. Another aim is to provide an AM device having characteristics such as a short response time, a large voltage holding ratio, a low threshold voltage, a large contrast ratio and a long service life.

Solution to Problem

The invention concerns a liquid crystal composition that has a negative dielectric anisotropy and contains at least one compound selected from the group of compounds represented by formula (1) as a first component, and a liquid crystal display device including the composition:

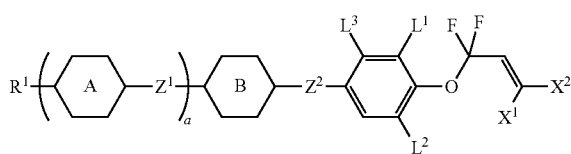

(1)

wherein, in formula (1), $R^1$ is alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring A and ring B are independently 1,4-cyclohexylene, 1,4-cyclohexenylene, 1,4-phenylene or 1,4-phenylene in which at least one piece of hydrogen is replaced by fluorine or chlorine, tetrahydropyran-2,5-diyl, 1,3-dioxane-2,5-diyl, pyrimidine-2,5-diyl, or pyridine-2,5-diyl; $Z^1$ and $Z^2$ are independently a single bond, —$CH_2CH_2$—, —C≡C—, —CH=CH—, —CF=CF—, —$CF_2O$—, —$OCF_2$—, —$CH_2O$—, —$OCH_2$—, —COO— or —OCO—; $L^1$, $L^2$ and $L^3$ are independently hydrogen, fluorine or chlorine; $X^1$ and $X^2$ are independently hydrogen or fluorine; and a is 0, 1, 2 or 3.

The invention also concerns use of the liquid crystal composition in a liquid crystal display device.

The invention further concerns use of the liquid crystal composition in a polymer sustained alignment mode liquid crystal display device.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another advantage is a liquid crystal composition having a suitable balance regarding at least two of the characteristics. Another advantage is a liquid crystal display device including such a composition. Another advantage is an AM device having characteristics such as a short response time, a large voltage holding ratio, a low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. The liquid crystal display device is a generic term for a liquid crystal display panel and a liquid crystal display module. A liquid crystal compound is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and a dielectric anisotropy. The compound has a six-membered ring such as 1,4-cyclohexylene and 1,4-phenylene, and has rod-like molecular structure. A polymerizable compound is a compound to be added for the purpose of forming a polymer in the composition.

The liquid crystal composition is prepared by mixing a plurality of liquid crystal compounds. An additive is added to the composition for the purpose of further adjusting the physical properties. The additive such as an optically active compound, an antioxidant, an ultraviolet light absorber, a dye, an antifoaming agent, the polymerizable compound, a polymerization initiator, a polymerization inhibitor and a polar compound is added when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive in a manner similar to the proportion of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having a large specific resistance" means that the composition has a large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for the long period of time. An expression "increase the dielectric anisotropy" means that a value of dielectric anisotropy positively increases in a liquid crystal composition having a positive dielectric anisotropy, and the value of dielectric anisotropy negatively increases in a liquid crystal composition having a negative dielectric anisotropy.

An expression "at least one piece of 'A' may be replaced by 'B'" means that the number of 'A' is arbitrary. When the number of 'A' is 1, a position of 'A' is arbitrary, and also when the number of 'A' is 2 or more, positions thereof can be selected without restriction. A same rule applies also to an expression "at least one piece of 'A' is replaced by 'B'."

In formula (1) to formula (4), a symbol A, B or the like surrounded by a hexagonal shape corresponds to ring A, ring B or the like, respectively. In formula (4), an oblique line crossing the hexagonal shape of ring J means that a bonding position on a ring can be arbitrarily selected for a $P^1$-$Sp^1$ group. A same rule applies also to a $P^2$-$Sp^2$ group or the like of ring k, and so forth. A subscript such as f represents the number of groups subjected to bonding with ring J or the like. When f is 2, two pieces of $P^1$-$Sp^1$ exist on ring J. Two of groups represented by $P^1$-$Sp^1$ may be identical or different. A same rule applies also to two of arbitrary groups when f is larger than 2. A same rule applies also to any other group. A compound represented by formula (1) maybe occasionally abbreviated as compound (1). The abbreviation applies also to a compound represented by formula (2) or the like. Compound (1) means one compound or two or more compounds represented by formula (1). A symbol of terminal group $R^1$ is used for a plurality of compounds in chemical formulas of component compounds. In the compounds, two groups represented by two pieces of arbitrary $R^1$ may be identical or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies also to a symbol of any other terminal group or the like. In formula (2), when b is 2, two of rings C exists. In the compound, two rings represented by two of rings C may be identical or different. A same rule applies also to two of arbitrary rings C when b is larger than 2. A same rule applies also to a symbol such as $Z^3$, ring F or the like.

Then, 2-fluoro-1,4-phenylene means two divalent groups described below. In a chemical formula, fluorine may be leftward (L) or rightward (R). A same rule applies also to a divalent group of asymmetrical ring such as tetrahydropyran-2,5-diyl.

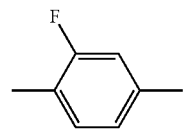

(L)

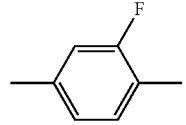

(R)

The invention includes the items described below.

Item 1. A liquid crystal composition that has a negative dielectric anisotropy, and contains at least one compound selected from the group of compounds represented by formula (1) as a first component:

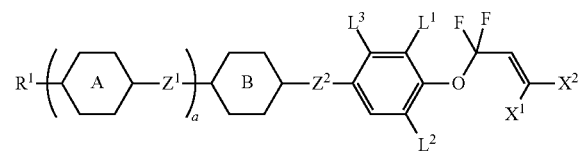

(1)

wherein, in formula (1), $R^1$ is alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring A and ring B are independently 1,4-cyclohexylene, 1,4-cyclohexenylene, 1,4-phenylene or 1,4-phenylene in which at least one piece of hydrogen is replaced by fluorine or chlorine, tetrahydropyran-2,5-diyl, 1,3-dioxane-2,5-diyl, pyrimidine-2,5-diyl, or pyridine-2,5-diyl; $Z^1$ and $Z^2$ are independently a single bond, —$CH_2CH_2$—, —C≡C—, —CH=CH—, —CF=CF—, —$CF_2O$—, —$OCF_2$—, —$CH_2O$—, —$OCH_2$—, —COO— or —OCO—; $L^1$, $L^2$ and $L^3$ are independently hydrogen, fluorine or chlorine; $X^1$ and $X^2$ are independently hydrogen or fluorine; and a is 0, 1, 2 or 3.

Item 2. The liquid crystal composition according to item 1, containing at least one compound selected from the group of compounds represented by formulas (1-1) to (1-8) as the first component:

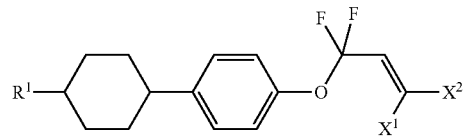

(1-1)

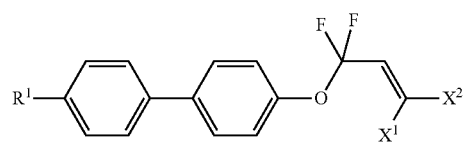

(1-2)

-continued (1-3)
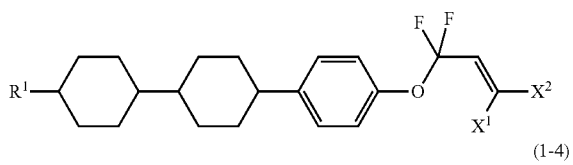

(1-4)
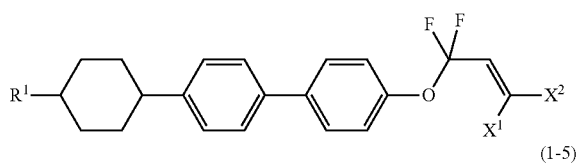

(1-5)
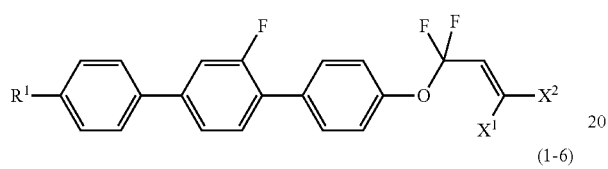

(1-6)
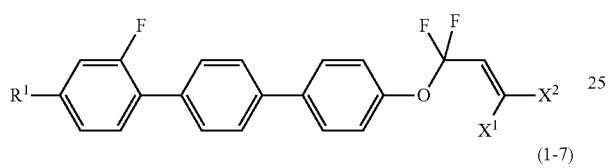

(1-7)
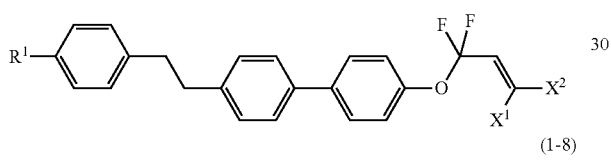

(1-8)
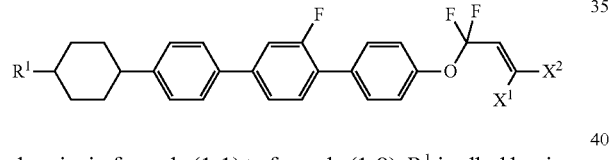

wherein, in formula (1-1) to formula (1-8), $R^1$ is alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; and $X^1$ and $X^2$ are independently hydrogen or fluorine.

Item 3. The liquid crystal composition according to item 1 or 2, wherein a proportion of the first component is in the range of 3% by weight to 30% by weight based on the weight of the liquid crystal composition.

Item 4. The liquid crystal composition according to any one of items 1 to 3, containing at least one compound selected from the group of compounds represented by formula (2) as a second component:

(2)
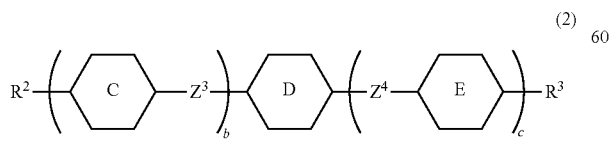

wherein, in formula (2), $R^2$ and $R^3$ are independently alkyl having 1 to 12 carbons, alkoxy having 1 to 12 carbons, alkenyl having 2 to 12 carbons, or alkenyloxy having 2 to 12 carbons; ring C and ring E are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; b is 1, 2 or 3; c is 0 or 1; and a sum of b and c is 3 or less.

Item 5. The liquid crystal composition according to anyone of items 1 to 4, containing at least one compound selected from the group of compounds represented by formulas (2-1) to (2-21) as the second component:

(2-1)
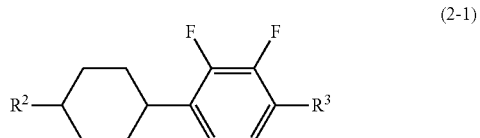

(2-2)
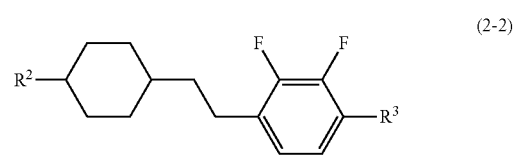

(2-3)
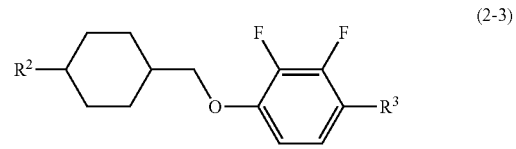

(2-4)
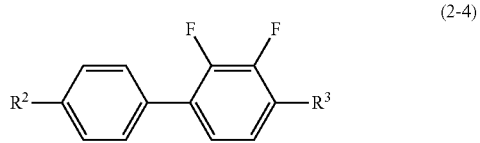

(2-5)
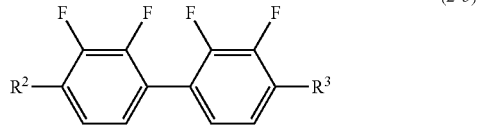

(2-6)
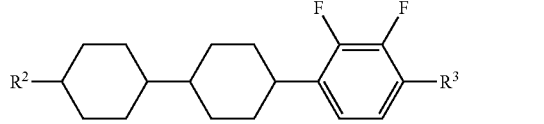

(2-7)
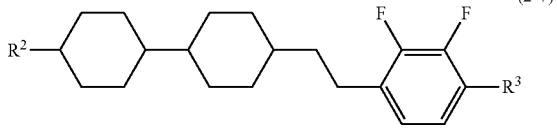

(2-8)
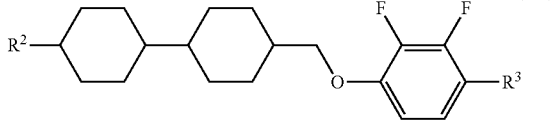

(2-9) 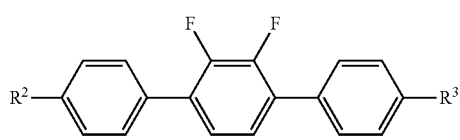

(2-10) 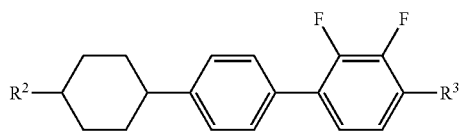

(2-11) 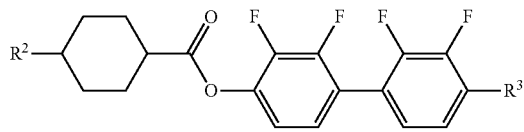

(2-12) 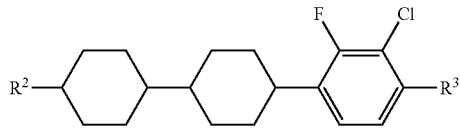

(2-13) 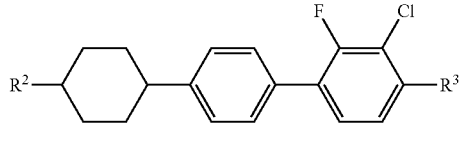

(2-14) 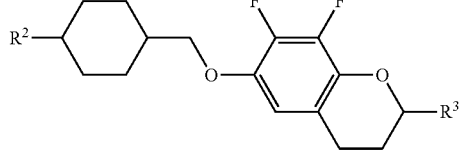

(2-15) 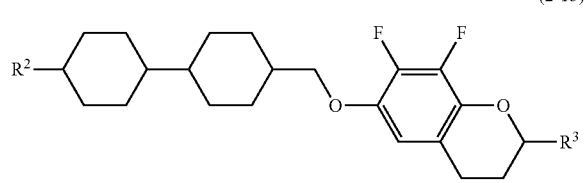

(2-16) 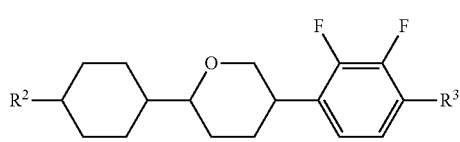

(2-17) 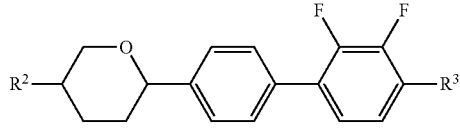

(2-18) 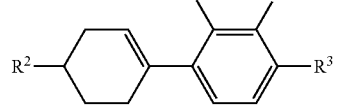

(2-19) 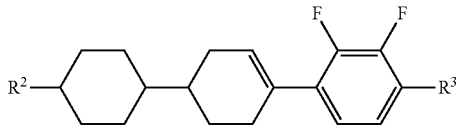

(2-20) 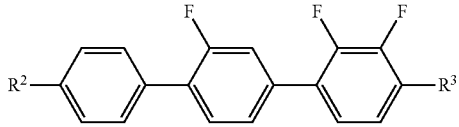

(2-21) 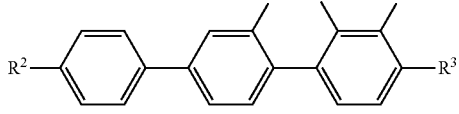

wherein, in formula (2-1) to formula (2-21), $R^2$ and $R^3$ are independently alkyl having 1 to 12 carbons, alkoxy having 1 to 12 carbons, alkenyl having 2 to 12 carbons, or alkenyloxy having 2 to 12 carbons.

Item 6. The liquid crystal composition according to item 4 or 5, wherein a proportion of the second component is in the range of 10% by weight to 90% by weight based on the weight of the liquid crystal composition.

Item 7. The liquid crystal composition according to any one of items 1 to 6, containing at least one compound selected from the group of compounds represented by formula (3) as a third component:

(3) 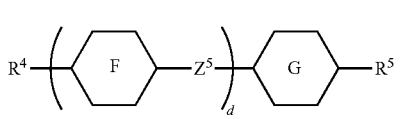

wherein, in formula (3), $R^4$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring F and ring G are independently 1,4-cyclohexylene, 1,4-phenylene, 2-fluoro-1,4-phenylene, or 2,5-difluoro-1,4-phenylene; $Z^5$ is a single bond, ethylene, carbonyloxy or methyleneoxy; and d is 1, 2 or 3.

Item 8. The liquid crystal composition according to any one of items 1 to 7, containing at least one compound selected from the group of compounds represented by formulas (3-1) to (3-13) as the third component:

(3-1) 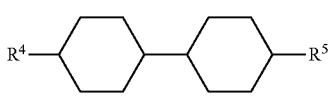

(3-2) 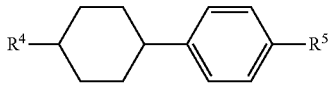

(3-3) 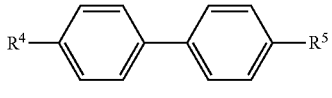

-continued (3-4)
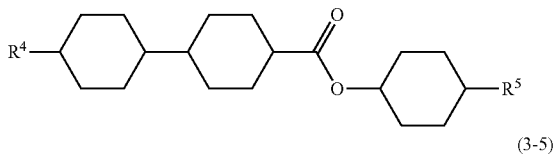

(3-5)
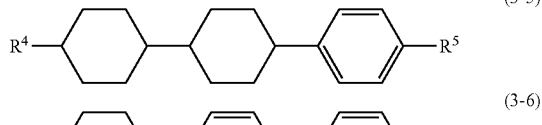

(3-6)
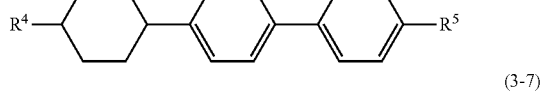

(3-7)
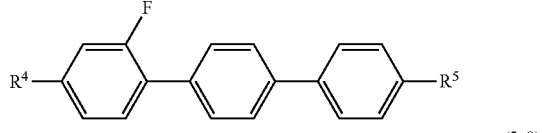

(3-8)
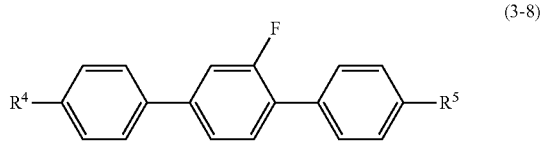

(3-9)
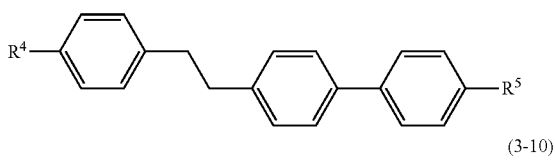

(3-10)
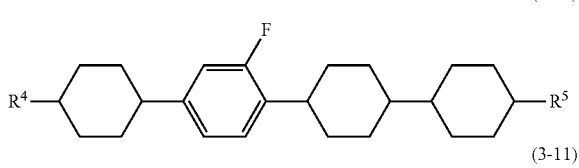

(3-11)
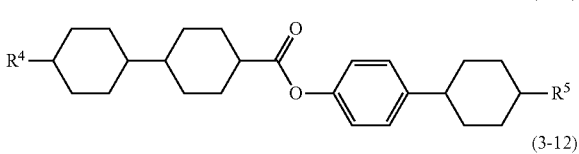

(3-12)
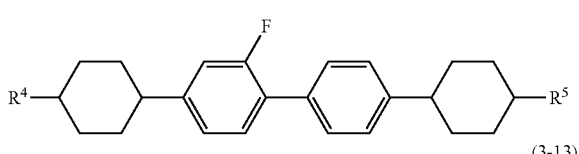

(3-13)
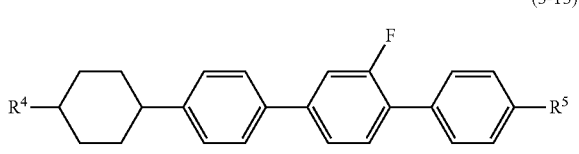

wherein, in formula (3-1) to formula (3-13), $R^4$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

Item 9. The liquid crystal composition according to item 7 or 8, wherein a proportion of the third component is in the range of 20% by weight to 70% by weight based on the weight of the liquid crystal composition.

Item 10. The liquid crystal composition according to any one of items 1 to 9, containing at least one polymerizable compound selected from the group of compounds represented by formula (4) as an additive component:

(4)
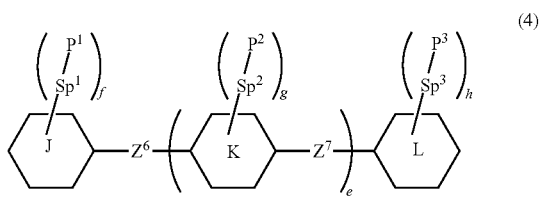

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen maybe replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine; e is 0, 1 or 2; f, g and h are independently 0, 1, 2, 3 or 4; and a sum of f, g and h is 1 or more.

Item 11. The liquid crystal composition according to item 10, wherein, in formula (4), $P^1$, $P^2$ and $P^3$ are independently a polymerizable group selected from the group of groups represented by formulas (P-1) to (P-6):

(P-1)
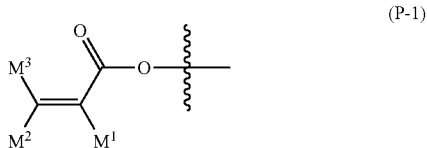

-continued

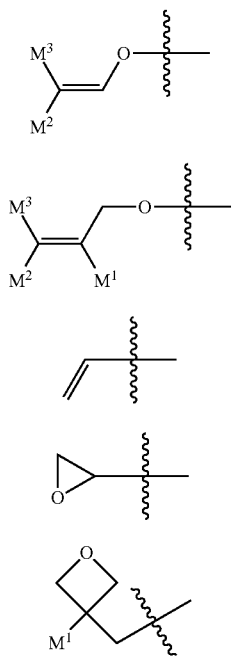

(P-2)

(P-3)

(P-4)

(P-5)

(P-6)

wherein, in formula (P-1) to formula (P-6), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine;

wherein, in formula (4), when all of f pieces of $P^1$ and h pieces of $P^3$ are the group represented by formula (P-4), at least one of f pieces of $Sp^1$ and h pieces of $Sp^3$ is alkylene in which at least one piece of —CH$_2$— is replaced by —O—, —COO—, —OCO— or —OCOO—.

Item 12. The liquid crystal composition according to any one of items 1 to 11, containing at least one polymerizable compound selected from the group of compounds represented by formulas (4-1) to (4-27) as the additive component:

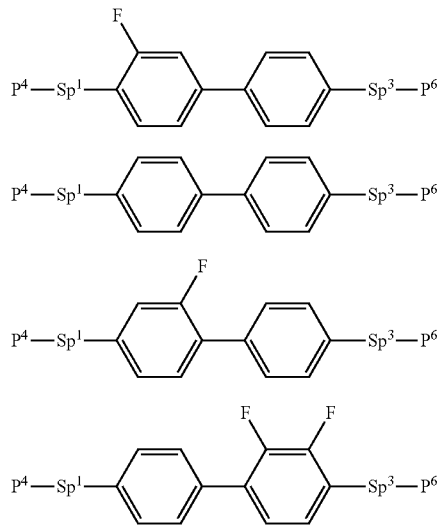

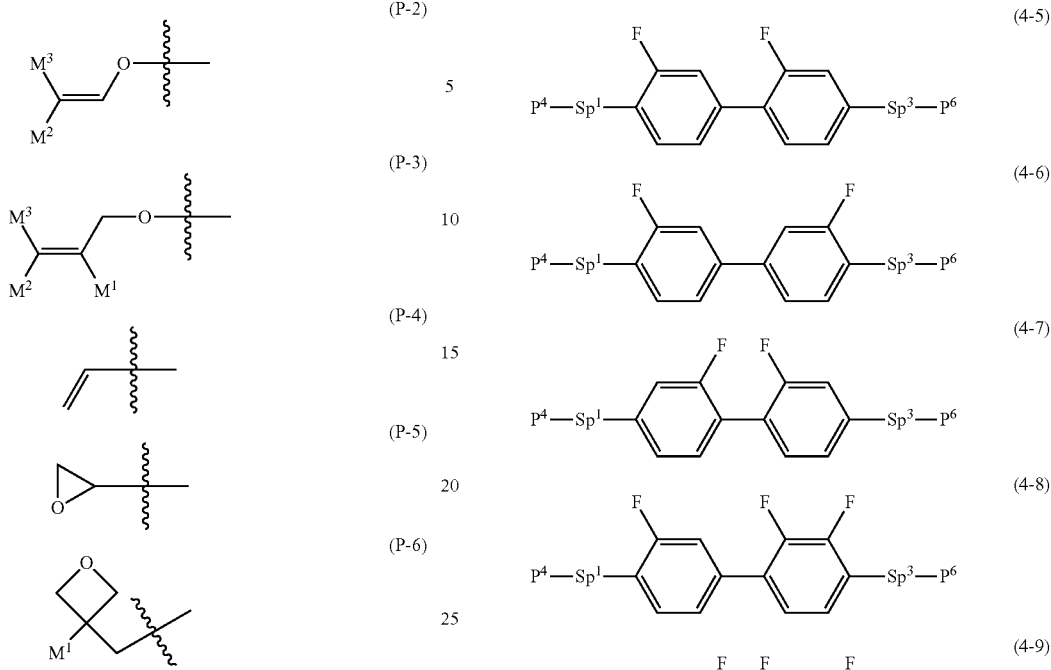

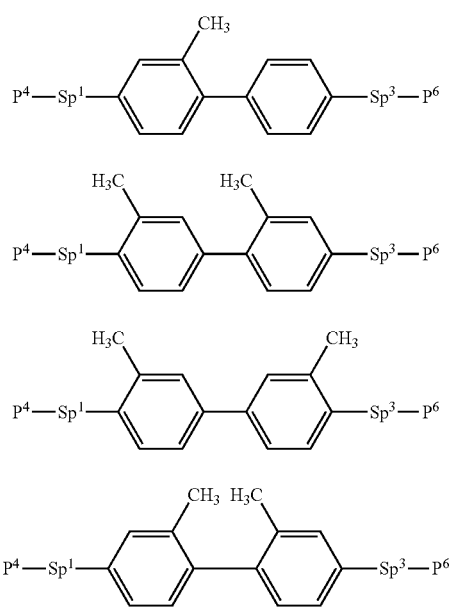

(4-16)
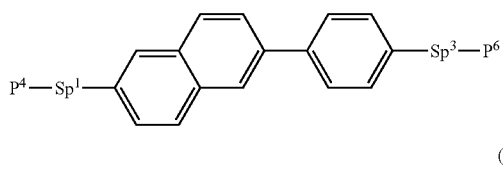

(4-17)
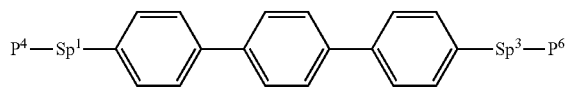

(4-18)
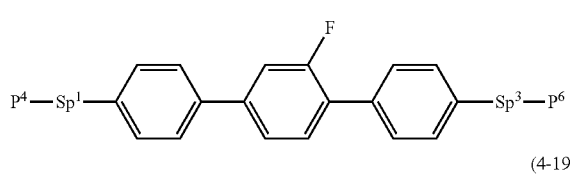

(4-19)
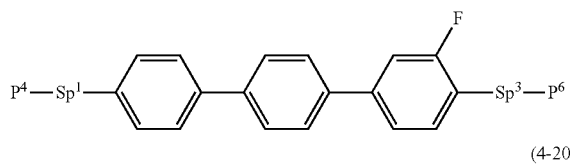

(4-20)
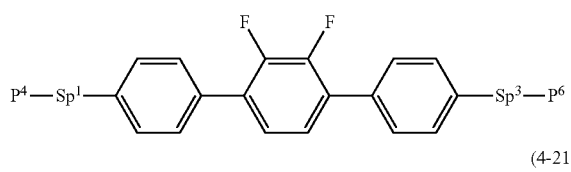

(4-21)
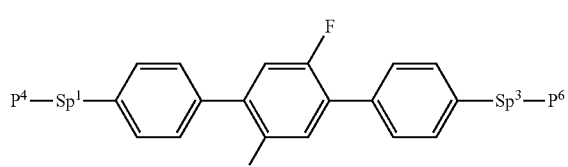

(4-22)
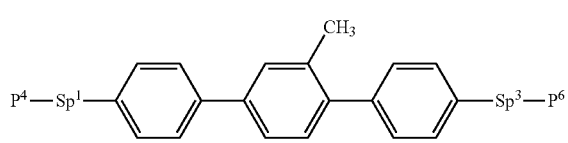

(4-23)
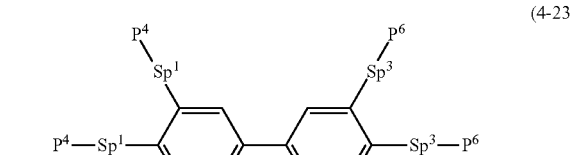

(4-24)
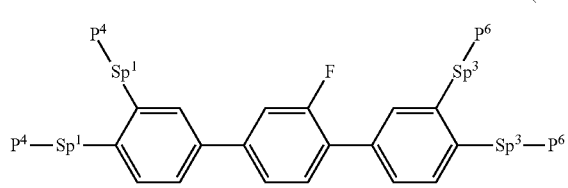

(4-25)
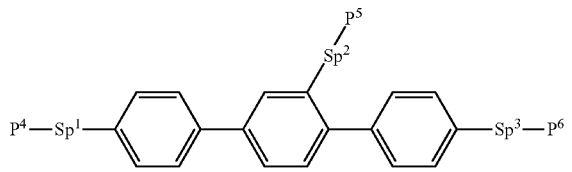

(4-26)
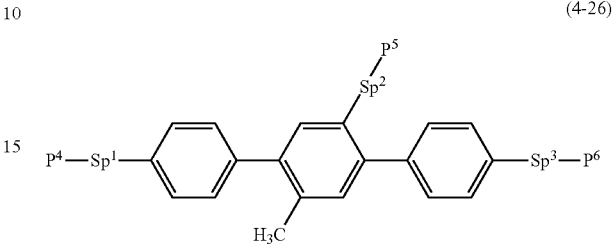

(4-27)
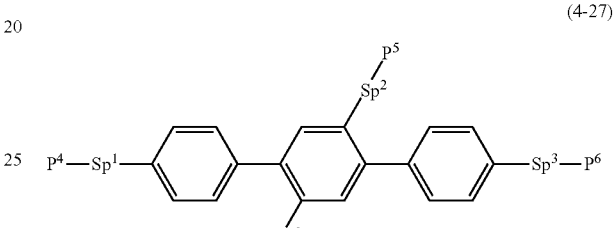

wherein, in formula (4-1) to formula (4-27), $P^4$, $P^5$ and $P^6$ are independently a polymerizable group selected from the group of groups represented by formula (P-1) to formula (P-3);

(P-1)
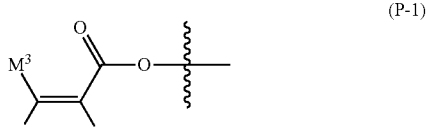

(P-2)
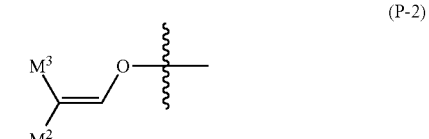

(P-3)
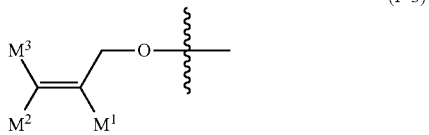

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine; and in formula (4-1) to formula (4-27), $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine.

Item 13. The liquid crystal composition according to any one of items 10 to 12, wherein a proportion of addition of the additive component is in the range of 0.03% by weight to 10% by weight based on the weight of the liquid crystal composition.

Item 14. A liquid crystal display device, including the liquid crystal composition according to any one of items 1 to 13.

Item 15. The liquid crystal display device according to item 14, wherein an operating mode in the liquid crystal display device includes an IPS mode, a VA mode, an FFS mode or an FPA mode, and a driving mode in the liquid crystal display device includes an active matrix mode.

Item 16. A polymer sustained alignment mode liquid crystal display device, wherein the liquid crystal display device includes the liquid crystal composition according to any one of items 10 to 13, or the polymerizable compound in the liquid crystal composition is polymerized.

Item 17. Use of the liquid crystal composition according to any one of items 1 to 13 in a liquid crystal display device.

Item 18. Use of the liquid crystal composition according to any one of items 10 to 13 in a polymer sustained alignment mode liquid crystal display device.

The invention further includes the following items: (a) the composition, further containing at least one of additives such as an optically active compound, an antioxidant, an ultraviolet light absorber, a dye, an antifoaming agent, a polymerizable compound, a polymerization initiator, a polymerization inhibitor or a polar compound; (b) an AM device including the composition; (c) the composition further containing a polymerizable compound, and a polymer sustained alignment (PSA) mode AM device including the composition; (d) a polymer sustained alignment (PSA) mode AM device, wherein the device includes the composition, and a polymerizable compound in the composition is polymerized; (e) a device including the composition and having the PC mode, the TN mode, the STN mode, the ECB mode, the OCB mode, the IPS mode, the VA mode, the FFS mode or the FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compounds will be described. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to the compound selected from compound (1), compound (2), compound (3) and compound (4). An expression "any other liquid crystal compound" means a liquid crystal compound different from compound (1), compound (2), compound (3) and compound (4). Such a compound is mixed with the composition for the purpose of further adjusting the characteristics. The additive is the optically active compound, the antioxidant, the ultraviolet light absorber, the dye, the antifoaming agent, the polymerizable compound, the polymerization initiator, the polymerization inhibitor, the polar compound or the like.

Composition B consists essentially of liquid crystal compounds selected from compound (1), compound (2), compound (3) and compound (4). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and 0(zero) means "a value is nearly zero."

TABLE 2

Characteristics of Compounds

| | Compounds | | |
|---|---|---|---|
| | Compound (1) | Compound (2) | Compound (3) |
| Maximum temperature | S to L | S to L | S to L |
| Viscosity | S to M | M to L | S to M |
| Optical anisotropy | S to L | M to L | S to L |
| Dielectric anisotropy | S | M to L[1)] | 0 |
| Specific resistance | L | L | L |

[1)] A value of dielectric anisotropy is negative, and the symbol shows magnitude of an absolute value.

Upon mixing the component compounds with the composition, the main effects of the component compounds on the characteristics of the composition are as described below. Compound (1) decreases the viscosity or increases the maximum temperature. Compound (2) increases the dielectric anisotropy and decreases a minimum temperature. Compound (3) decreases the viscosity or increases the maximum temperature. Compound (4) is polymerized to give a polymer, and the polymer shortens a response time of the device, and improves image persistence.

Third, the combination of components in the composition, the preferred proportion of the component compounds and the basis thereof will be described. A preferred combination of components in the composition includes a combination of the first component and the second component, a combination of the first component and the third component, a combination of the first component and the additive component, a combination of the first component, the second component and the third component, a combination of the first component, the second component and the additive component, a combination of the first component, the third component and the additive component, or a combination of the first component, the second component, the third component and the additive component. A further preferred combination includes the combination of the first component, the second component and the third component or the combination of the first component, the second component, the third component and the additive component.

A preferred proportion of the first component is approximately 3% by weight or more for increasing the maximum temperature, and approximately 30% by weight or less for decreasing the minimum temperature. A further preferred proportion is in the range of approximately 3% by weight to approximately 25% by weight. A particularly preferred proportion is in the range of approximately 5% by weight to approximately 20% by weight.

A preferred proportion of the second component is approximately 10% by weight or more for increasing the dielectric anisotropy, and approximately 90% by weight or less for decreasing the minimum temperature. A further preferred proportion is in the range of approximately 20% by weight to approximately 80% by weight. A particularly preferred proportion is in the range of approximately 30% by weight to approximately 70% by weight.

A preferred proportion of the third component is approximately 20% by weight or more for increasing the maximum temperature or decreasing the viscosity, and approximately 70% by weight or less for increasing the dielectric anisotropy. A further preferred proportion is in the range of approximately 20% by weight to approximately 65% by weight. A particularly preferred proportion is in the range of approximately 25% by weight to approximately 60% by weight.

Compound (4) is added to the composition for the purpose of adapting the composition to the polymer sustained alignment mode device. A preferred proportion of compound (4) is approximately 0.03% by weight or more for improving a long term reliability in a device, and approximately 10% by weight or less for preventing poor display in the device. A further preferred proportion is in the range of approximately 0.1% by weight to approximately 2% by weight. A particularly preferred proportion is in the range of approximately 0.2% by weight to approximately 1.0% by weight.

Fourth, the preferred embodiment of the component compounds will be described. In formula (1), formula (2) and formula (3), $R^1$, $R^4$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine. Preferred $R^1$, $R^4$ or $R^5$ is alkenyl having 2 to 12 carbons for decreasing the viscosity, and alkyl having 1 to 12 carbons for increasing the stability. $R^2$ and $R^3$ are independently alkyl having 1 to 12 carbons, alkoxy having 1 to 12 carbons, alkenyl having 2 to 12 carbons or alkenyloxy having 2 to 12 carbons. Preferred $R^2$ or $R^3$ is alkyl having 1 to 12 carbons for increasing the stability, and alkoxy having 1 to 12 carbons for increasing the dielectric anisotropy.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Preferred examples of alkyl in which at least one piece of hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Preferred examples of alkenyl in which at least one piece of hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring A and ring B are independently 1,4-cyclohexylene, 1,4-cyclohexenylene, 1,4-phenylene, 1,4-phenylene in which at least one piece of hydrogen is replaced by fluorine or chlorine, tetrahydropyran-2,5-diyl, 1,3-dioxane-2,5-diyl, pyrimidine-2,5-diyl or pyridine-2,5-diyl. Preferred ring A or ring B is 1,4-cyclohexylene, 1,4-phenylene, 1,4-phenylene in which at least one piece of hydrogen is replaced by fluorine or chlorine, tetrahydropyran-2,5-diyl, or 1,3-dioxane-2,5-diyl. Further preferred ring A or ring B is 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl. Wherein, preferred examples of 1,4-phenylene in which at least one piece of hydrogen is replaced by fluorine or chlorine include 2-fluoro-1,4-phenylene, 2,6-difluoro-1,4-phenylene, 2-chloro-6-fluoro-1,4-phenylene, 2,6-dichloro-1,4-phenylene or 2-chloro-1,4-phenylene. Further preferred examples of 1,4-phenylene in which at least one piece of hydrogen is replaced by fluorine or chlorine include 2-fluoro-1,4-phenylene or 2,6-difluoro-1,4-phenylene.

Ring C and ring E are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl. Wherein, preferred examples of 1,4-phenylene in which at least one piece of hydrogen is replaced by fluorine or chlorine include 2-fluoro-1,4-phenylene, 2,3-difluoro-1,4-phenylene or 2-chloro-3-fluoro-1,4-phenylene. Preferred ring C or ring E is 1,4-cyclohexylene for decreasing the viscosity, tetrahydropyran-2,5-diyl for increasing the dielectric anisotropy, and 1,4-phenylene for increasing the optical anisotropy. Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring D is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy. Ring F and ring G are independently 1,4-cyclohexylene, 1,4-phenylene, 2-fluoro-1,4-phenylene or 2,5-difluoro-1,4-phenylene. Preferred ring F or ring G is 1,4-cyclohexylene for decreasing the viscosity or increasing the maximum temperature, and 1,4-phenylene for decreasing the minimum temperature. With regard to the configuration of 1,4-cyclohexylene, trans is preferred to cis for increasing the maximum temperature. Tetrahydropyran-2,5-diyl includes:

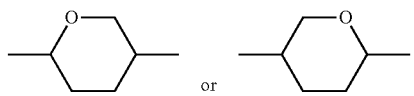

preferably

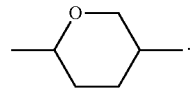

$Z^1$ and $Z^2$ are independently a single bond, —CH$_2$CH$_2$—, —C≡C—, —CH═CH—, —CF═CF—, —CF$_2$O—, —OCF$_2$—, —CH$_2$O—, —OCH$_2$—, —COO— or —OCO—. Preferred $Z^1$ or $Z^2$ is a single bond, —CH$_2$CH$_2$—, —CH═CH—, —CF═CF—, —COO— or —CF$_2$O—. Further preferred $Z^1$ or $Z^2$ is a single bond for decreasing the viscosity. $Z^3$, $Z^4$ and $Z^5$ are independently a single bond, ethylene, carbonyloxy or methyleneoxy. Preferred $Z^3$ or $Z^4$ is a single bond for decreasing the viscosity, ethylene for decreasing the minimum temperature, and methyleneoxy for increasing the dielectric anisotropy. Preferred $Z^5$ is a single bond for decreasing the viscosity, ethylene for decreasing the minimum temperature, and carbonyloxy for increasing the maximum temperature.

$X^1$ and $X^2$ are independently hydrogen or fluorine.

$L^1$, $L^2$ and $L^3$ are independently hydrogen, fluorine or chlorine. Preferred $L^1$, $L^2$ or $L^3$ is hydrogen for decreasing the viscosity.

Then, a is 0, 1, 2 or 3. Preferred a is 1 for decreasing the viscosity, and 2 for increasing the maximum temperature. Then, b is 1, 2 or 3, c is 0 or 1, and a sum of b and c is 3 or less. Preferred b is 1 for decreasing the viscosity, and 2 or 3 for increasing the maximum temperature. Preferred c is 0 for decreasing the viscosity, and 1 for decreasing the minimum temperature. Then, d is 1, 2 or 3. Preferred d is 1 for decreasing the viscosity, and 2 or 3 for increasing the maximum temperature.

In compound (4), $P^1$, $P^2$ and $P^3$ are independently a polymerizable group. Preferred $P^1$, $P^2$ or $P^3$ is a polymerizable group selected from the group of groups represented by formula (P-1) to formula (P-6). Further preferred $P^1$, $P^2$ or $P^3$ is group (P-1) or group (P-2). Particularly preferred group (P-1) is —OCO—CH═CH$_2$ or —OCO—C(CH$_3$)═CH$_2$. A wavy line from group (P-1) to group (P-6) represents a site to form a bonding.

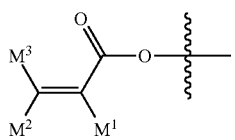
(P-1)

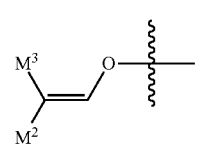
(P-2)

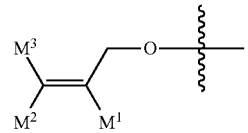
(P-3)

(P-4)

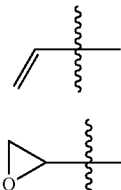

(P-5)

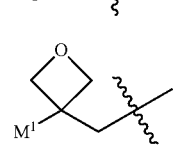

(P-6)

In group (P-1) to group (P-6), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine. Preferred $M^1$, $M^2$ or $M^3$ is hydrogen or methyl for increasing the reactivity. Further preferred $M^1$ is methyl, and further preferred $M^2$ or $M^3$ is hydrogen. When at least two of f pieces of $P^1$, g pieces of $P^2$ and h pieces of $P^3$ is group (P-1), two pieces of arbitrary $M^1$, $M^2$ or $M^3$ of $P^1$, $P^2$ and $P^3$ may be identical or different. A same rule applies also to group (P-2) or group (P-3).

When all of f pieces of $P^1$ and h pieces of $P^3$ are group (P-4), at least one of f pieces of $Sp^1$ and h pieces of $Sp^3$ is alkylene in which at least one piece of —CH$_2$— is replaced by —O—, —COO—, —OCO— or —OCOO—. Namely, a case where all of f pieces of $P^1$ and h pieces of $P^3$ are alkenyl such as 1-propenyl is impossible.

In formula (4-1) to formula (4-27), $P^4$, $P^5$ and $P^6$ are independently a group represented by formulas (P-1) to (P-3). Preferred $P^4$, $P^5$ or $P^6$ is group (P-1) or group (P-2). Further preferred group (P-1) is —OCO—CH═CH$_2$ or —OCO—C(CH$_3$)═CH$_2$. A wavy line from group (P-1) to group (P-3) represents a site to form a bonding.

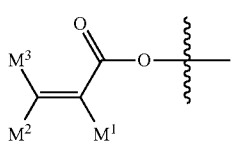
(P-1)

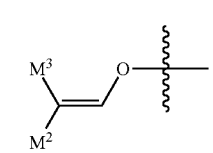
(P-2)

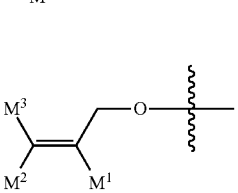
(P-3)

When at least two pieces of one or two pieces of $P^4$, one or two pieces of $P^5$ and one or two pieces of $P^6$ is group (P-1), two pieces of arbitrary $M^1$, $M^2$ or $M^3$ of $P^4$, $P^5$ and $P^6$ may be identical or different. A same rule applies also to group (P-2) or group (P-3).

In formula (4), $Sp^1$, $Sp^2$ and $Sp^3$ are independently a single bond or alkylene having 1 to 10 carbons, and in the alkylene, at least one piece of —CH2— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine. Preferred $Sp^1$, $Sp^2$ or $Sp^3$ is a single bond.

Ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons or alkyl having 1 to 12 carbons in which at least one piece of hydrogen is replaced by fluorine or chlorine. Preferred ring J or ring L is phenyl. Ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons or alkyl having 1 to 12 carbons in which at least one piece of hydrogen is replaced by fluorine or chlorine. Preferred ring K is 1,4-phenylene or 2-fluoro-1,4-phenylene.

$Z^6$ and $Z^7$ are independently a single bond or alkylene having 1 to 10 carbons, and in the alkylene, at least one piece of —CH$_2$— may be replaced by —O—, —CO—, —COO— or —OCO—, at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine. Preferred $Z^6$ or $Z^7$ is a single bond, —CH2CH2—, —CH$_2$O—, —OCH$_2$—, —COO— or —OCO—. Further preferred $Z^6$ or $Z^7$ is a single bond.

Then, e is 0, 1 or 2. Preferred e is 0 or 1. Then, f, g and h are independently 0, 1, 2, 3 or 4, and a sum of f, g and h is 1 or more. Preferred f, g or h is 1 or 2.

Fifth, the preferred component compounds will be described. Preferred compound (1) includes compound (1-1) to compound (1-8) described in item 2. In the compounds, at least one of the first components preferably includes compound (1-2), compound (1-3), compound (1-4), compound (1-5) or compound (1-7). At least two of the first components preferably includes a combination of compound (1-1) and compound (1-3), or a combination of compound (1-1) and compound (1-4).

Preferred compound (2) includes compound (2-1) to compound (2-21) described in item 5. In the compounds, at least one of the second components preferably includes compound (2-1), compound (2-3), compound (2-4), compound (2-6), compound (2-8) or compound (2-10). At least two of the second components preferably includes a combination of compound (2-1) and compound (2-6), a combination of compound (2-1) and compound (2-10), a combination of compound (2-3) and compound (2-6), a combination of compound (2-3) and compound (2-10), a combination of compound (2-4) and compound (2-6), or a combination of compound (2-4) and compound (2-8).

Preferred compound (3) includes compound (3-1) to compound (3-13) described in item 8. In the compounds, at least one of the third components preferably includes compound (3-1), compound (3-3), compound (3-5), compound (3-6), compound (3-8) or compound (3-9). At least two of the third components preferably includes a combination of compound (3-1) and compound (3-3), a combination of compound (3-1) and compound (3-5), or a combination of compound (3-1) and compound (3-6).

Preferred compound (4) includes compound (4-1) to compound (4-27) described in item 12. In the compounds, at least one of the additive components preferably includes compound (4-1), compound (4-2), compound (4-24), compound (4-25), compound (4-26) or compound (4-27). At least two of the additive components preferably includes a combination of compound (4-1) and compound (4-2), a combination of compound (4-1) and compound (4-18), a combination of compound (4-2) and compound (4-24), a combination of compound (4-2) and compound (4-25), a combination of compound (4-2) and compound (4-26), a combination of compound (4-25) and compound (4-26) or a combination of compound (4-18) and compound (4-24). In group (P-1) to group (P-3), preferred $M^1$, $M^2$ or $M^3$ is hydrogen or methyl. Preferred $Sp^1$, $Sp^2$ or $Sp^3$ is a single bond, —CH$_2$CH$_2$—, —CH$_2$O—, —OCH$_2$—, —COO—, —OCO—, —CO—CH=CH— or —CH=CH—CO—.

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor, the polar compound or the like. The optically active compound is added to the composition for inducing a helical structure in a liquid crystal to give a twist angle. Examples of such a compound include compound (5-1) to compound (5-5). A preferred proportion of the optically active compound is approximately 5% by weight or less. A further preferred proportion is in the range of approximately 0.01% by weight to approximately 2% by weight.

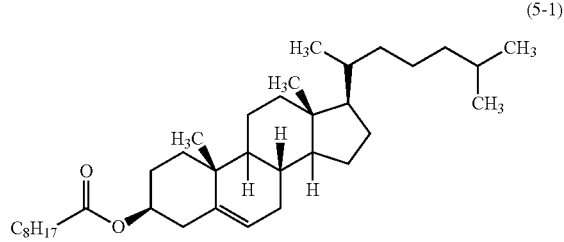

(5-1)

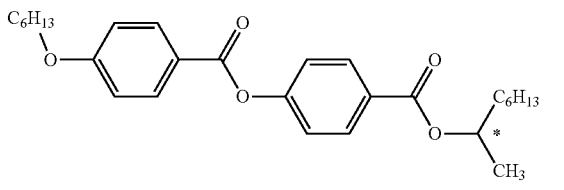

(5-2)

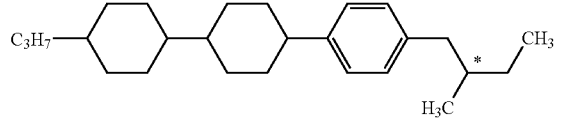

(5-3)

(5-4)

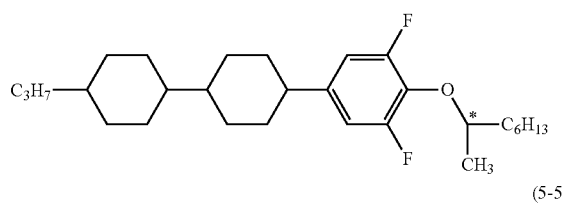

(5-5)

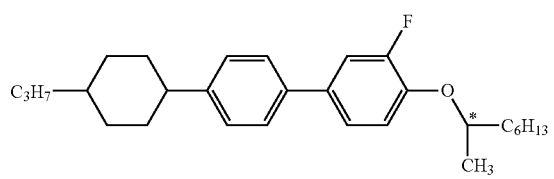

The antioxidant is added to the composition for preventing a decrease in the specific resistance caused by heating in air, or for maintaining a large voltage holding ratio at room temperature and also at the temperature close to the maximum temperature after the device has been used for a long period of time. Preferred examples of the antioxidant include compound (6) where n is an integer from 1 to 9 or the like.

(6)

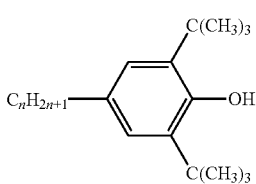

In compound (6), preferred n is 1, 3, 5, 7 or 9. Further preferred n is 7. Compound (6) where n is 7 is effective for maintaining the large voltage holding ratio at room temperature and also at the temperature close to the maximum temperature even after the device has been used for a long period of time because the compound (6) has a small volatility. A preferred proportion of the antioxidant is approximately 50 ppm or more for achieving an effect thereof, and approximately 600 ppm or less for avoiding a decrease in the maximum temperature or an increase in the minimum temperature. A further preferred proportion is in the range of approximately 100 ppm to approximately 300 ppm.

Preferred examples of the ultraviolet light absorber include a benzophenone derivative, a benzoate derivative and a triazole derivative. A light stabilizer such as an amine having steric hindrance is also preferred. A preferred proportion of the absorber or the stabilizer is approximately 50 ppm or more for achieving an effect thereof, and approximately 10,000 ppm or less for avoiding the decrease in the maximum temperature or avoiding the increase in the minimum temperature. A further preferred proportion is in the range of approximately 100 ppm to approximately 10,000 ppm.

A dichroic dye such as an azo dye or an anthraquinone dye is added to the composition for the purpose of adapting the composition to a device having a guest host (GH) mode. A preferred proportion of the dye is in the range of approximately 0.01% by weight to approximately 10% by weight. The antifoaming agent such as dimethyl silicone oil or methyl phenyl silicone oil is added to the composition for preventing foam formation. A preferred proportion of the antifoaming agent is approximately 1 ppm or more for achieving an effect thereof, and approximately 1,000 ppm or less for avoiding a poor display. A further preferred proportion is in the range of approximately 1 ppm to approximately 500 ppm.

The polymerizable compound is used to be adapted for a polymer sustained alignment (PSA) mode device. Compound (4) is suitable for the purpose. Any other polymerizable compound that is different from compound (4) may be added to the composition together with compound (4). Preferred examples of the polymerizable compounds include acrylate, methacrylate, a vinyl compound, a vinyloxy compound, propenyl ether, an epoxy compound (oxirane and oxetane) and a vinyl ketone compound. Further preferred examples include an acrylate derivative or a methacrylate derivative. A preferred proportion of compound (4) is 10% by weight or more based on the total weight of the polymerizable compound. A further preferred proportion is 50% by weight or more. A Particularly preferred proportion is 80% by weight or more. A most preferred proportion is 100% by weight.

The polymerizable compound such as compound (4) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of approximately 0.1% by weight to approximately 5% by weight based on the total weight of the polymerizable compound. A further preferred proportion is in the range of approximately 1% by weight to approximately 3% by weight based thereon.

Upon storing the polymerizable compound such as compound (4), the polymerization inhibitor may be added thereto for preventing polymerization. The polymerizable compound is ordinarily added to the composition without removing the polymerization inhibitor. Examples of the polymerization inhibitor include hydroquinone and a hydroquinone derivative such as methylhydroquinone, 4-tert-butylcatechol, 4-methoxyphenol or phenothiazine.

Seventh, the methods for synthesizing the component compounds will be described. The compounds can be prepared according to known methods. Examples of the synthetic methods are described. Compound (2-6) is prepared by a method described in JP 2000-53602 A. Compound (3-1) is prepared by a method described in JP S59-176221 A. Compound (4-18) is prepared by a method described in JP H7-101900 A. A compound where n in formula (6) is 1 can be obtained from Sigma-Aldrich Corporation. A compound where n in compound (6) is 7 or the like can be prepared according to a method described in U.S. Pat. No.3,660,505 B. Compound (1-3) is prepared by a method described below.

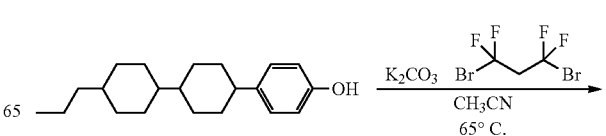

-continued

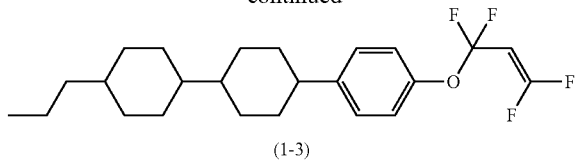

(1-3)

Then, 4-(4'-propyl-[1,1'-bi(cyclohexane)]-4-yl)phenol (2.00 g, 6.66 mmol) prepared according to a method described in JP 2007-277127 A, potassium carbonate (2.16 g, 15.62 mmol) and 1,3-dibromo-1,1,3,3-tetrafluoro propane (2.15 g, 7.83 mmol) are stirred at 65° C. for 3 hours in acetonitrile. A reaction liquid is poured into water and subjected to extraction with toluene. A combined organic layer is washed with water and saturated brine, and dried over magnesium sulfate, and then a solvent is distilled off by an evaporator. A residue is purified by silica gel chromatography and recrystallization to give compound (1-3) (yield: 8.6%).

$^1$H-NMR (CDCl$_3$) δ7.20-7.19 (m, 2H), 7.12-7.10 (m, 2H), 4.93-4.85 (m, 1H), 2.48-2.43 (m, 1H), 1.94-1.85 (m, 3H), 1.80-1.75 (m, 3H), 1.43-1.28 (m, 8H), 1.18-0.98 (m, 7H), 0.91-0.85 (m, 5H).

Any compounds whose synthetic methods are not described can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. The composition mainly has a minimum temperature of approximately –10° C. or lower, a maximum temperature of approximately 70° C. or higher, and an optical anisotropy in the range of approximately 0.07 to approximately 0.20. A device including the composition has the large voltage holding ratio. The composition is suitable for use in the AM device. The composition is particularly suitable for use in a transmissive AM device. The composition having an optical anisotropy in the range of approximately 0.08 to approximately 0.25 may be prepared by controlling the proportion of the component compounds or by mixing any other liquid crystal compound, and further the composition having an optical anisotropy in the range of approximately 0.10 to approximately 0.30 may be prepared. The composition can be used as the composition having the nematic phase, and as the optically active composition by adding the optically active compound.

The composition can be used for the AM device. The composition can also be used for a PM device. The composition can also be used for the AM device and the PM device each having a mode such as the PC mode, the TN mode, the STN mode, the ECB mode, the OCB mode, the IPS mode, the FFS mode, the VA mode and the FPA mode. Use for the AM device having the TN mode, the OCB mode, the IPS mode or the FFS mode is particularly preferred. In the AM device having the IPS mode or the FFS mode, alignment of liquid crystal molecules when no voltage is applied may be parallel or vertical to a glass substrate. The device may be of a reflective type, a transmissive type or a transflective type. Use for the transmissive device is preferred. Use for an amorphous silicon-TFT device or a polycrystal silicon-TFT device is allowed. The composition can also be used for a nematic curvilinear aligned phase (NCAP) device prepared by microencapsulating the composition, or for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples are mixed. The thus prepared compound was identified by methods such as an NMR analysis. Characteristics of the compound and the composition were measured by methods described below.

NMR analysis: For measurement, DRX-500 made by Bruker BioSpin Corporation was used. In $^1$H-NMR measurement, a sample was dissolved in a deuterated solvent such as CDCl$_3$, and measurement was carried out under conditions of room temperature, 500 MHz and 16 times of accumulation. Tetramethylsilane (TMS) was used as an internal standard. In $^{19}$F-NMR measurement, CFCl$_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: GC-14B Gas Chromatograph made by Shimadzu Corporation was used for measurement. A carrier gas was helium (2 mL per minute). A sample vaporizing chamber and a detector (FID) were set to 280° C. and 300° C., respectively. A capillary column DB-1 ;(length 30m, bore 0.32 mm, film thickness 0.25 µm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 µm) made by Agilent Technologies, Inc., Rtx-1 (length 30 m, bore 0.32 mm, film thickness 0.25 µm) made by Restek Corporation and BP-1 (length 30 m, bore 0.32 mm, film thickness 0.25 µm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A proportion of liquid crystal compounds contained in the composition may be calculated by the method as described below. The mixture of liquid crystal compounds is detected by gas chromatograph (FID). An area ratio of each peak in the gas chromatogram corresponds to the ratio (weight ratio) of the liquid crystal compound. When the capillary columns described above were used, a correction coefficient of each of the liquid crystal compounds may be regarded as 1 (one). Accordingly, the proportion (% by weight) of the liquid crystal compound is calculated from the area ratio of each peak.

Sample for measurement: When characteristics of a composition was measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)= {(measured value of a sample for measurement)−0.85× (measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

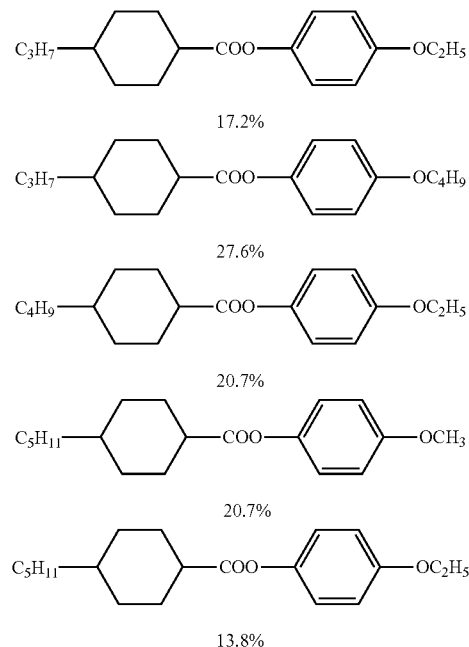

Measuring method: Measurement of characteristics was carried out by the methods described below. Most of the measuring methods are applied as described in the Standard of the Japan Electronics and Information Technology Industries Association (hereinafter abbreviated as JEITA) (JEITA EIAJ ED-2521B) discussed and established by JEITA, or modified thereon. No thin film transistor (TFT) was attached to a TN device used for measurement.

(1) Maximum temperature of nematic phase (NI; °C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; °C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ of the sample was expressed as $T_c$<−20° C. A minimum temperature of the nematic phase may be occasionally abbreviated as "minimum temperature."

(3) Viscosity (bulk viscosity; η; measured at 20° C.; mPa·s): A cone-plate (E type) rotational viscometer made by Tokyo Keiki, Inc. was used for measurement.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a VA device in which a distance (cell gap) between two glass substrates was 20 micrometers. Voltage was applied stepwise to the device in the range of 39 V to 50 V at an increment of 1 V. After a period of 0.2 second with no voltage application, voltage was applied repeatedly under conditions of only one rectangular wave (rectangular pulse; 0.2 second) and no voltage application (2 seconds). A peak current and a peak time of a transient current generated by the applied voltage were measured. A value of rotational viscosity was obtained from the measured values and a calculation equation (8) described on page 40 of the paper presented by M. Imai et al. Dielectric anisotropy required for the calculation was measured according to section (6) described below.

(5) Optical anisotropy (refractive index anisotropy; Δn; measured at 25° C.): Measurement was carried out by an Abbe refractometer, with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δε; measured at 25° C.): A value of dielectric anisotropy was calculated from an equation: Δε=ε∥−ε⊥. A dielectric constant (ε∥ and ε⊥) was measured as described below.

(1) Measurement of dielectric constant (ε∥): An ethanol (20 mL) solution of octadecyl triethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant ($\epsilon\|$) in a major axis direction of the liquid crystal molecules was measured.

(2) Measurement of dielectric constant ($\epsilon\perp$): A polyimide solution was applied to a well-cleaned glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant ($\epsilon\perp$) in a minor axis direction of the liquid crystal molecules was measured.

(7) Threshold voltage (Vth; measured at 25° C.; V): An LCD-5100 luminance meter made by Otsuka Electronics Co., Ltd. was used for measurement. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 10% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has a large stability to ultraviolet light. A value of VHR-3 is preferably 90% or more, and further preferably, 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has a large stability to heat.

(12) Response time (t; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally black mode VA device in which a distance (cell gap) between two glass substrates was 4 micrometers and a rubbing direction was anti-parallel. The device was sealed with an ultraviolet-curable adhesive. A voltage (rectangular waves; 60 Hz, 10 V, 0.5 second) was applied to the device. On the occasion, the device was irradiated with light from a direction perpendicular to the device, and an amount of light transmitted through the device was measured: The maximum amount of light corresponds to 100% transmittance and the minimum amount of light corresponds to 0% transmittance. A response time was expressed in terms of time required for a change from 90% transmittance to 10% transmittance (fall time; millisecond).

(13) Specific resistance ($\rho$; measured at 25° C.; $\Omega$cm): Into a vessel equipped with electrodes, 1.0 milliliter of a sample was injected. A direct current voltage (10 V) was applied to the vessel, and a direct current after 10 seconds was measured. Specific resistance was calculated from the following equation: (specific resistance)={(voltage)×(electric capacity of the vessel)}/{(direct current)×(dielectric constant of vacuum)}.

The compounds described in Examples were described using symbols according to definitions in Table 3 below. In Table 3, the configuration of 1,4-cyclohexylene is trans. A parenthesized number next to a symbolized compound in Examples corresponds to the number of the compound. A symbol (-) means any other liquid crystal compound. A proportion (percentage) of the liquid crystal compound is expressed in terms of weight percent (% by weight) based on the weight of the liquid crystal composition. Values of the characteristics of the composition were summarized in the last part.

TABLE 3

| Method for Description of Compounds using Symbols R—($A_1$)—$Z_1$— ... —$Z_n$—($A_n$)—R' | |
|---|---|
| 1) Left-terminal Group R— | Symbol |
| $C_nH_{2n+1}$— | n- |
| $C_nH_{2n+1}O$— | nO- |
| $C_mH_{2m+1}OC_nH_{2n}$— | mOn- |
| $CH_2$=CH— | V- |
| $C_nH_{2n+1}$—CH=CH— | nV- |
| $CH_2$=CH—$C_nH_{2n}$— | Vn- |
| $C_mH_{2m+1}$—CH=CH—$C_nH_{2n}$— | mVn- |
| $CF_2$=CH— | VFF- |
| $CF_2$=CH—$C_nH_{2n}$— | VFFn- |
| $CH_2$=CH—COO— | AC- |
| $CH_2$=C($CH_3$)—COO— | MAC- |
| 2) Right-terminal Group —R' | Symbol |
| —$C_nH_{2n+1}$ | -n |
| —$OC_nH_{2n+1}$ | -On |
| —CH=$CH_2$ | -V |
| —CH=CH—$C_nH_{2n+1}$ | -Vn |
| —$C_nH_{2n}$—CH=$CH_2$ | -nV |
| —$C_nH_{2m}$—CH=CH—$C_nH_{2n+1}$ | -mVn |
| —CH=$CF_2$ | -VFF |
| —$OCF_2CH$=$CF_2$ | -OCF2VFF |

TABLE 3-continued

Method for Description of Compounds using Symbols
R—(A₁)—Z₁— . . . —Zₙ—(Aₙ)—R'

| | |
|---|---|
| —OCF₂CH=CH₂ | -OCF2V |
| —OCO—CH=CH₂ | -AC |
| —OCO—C(CH₃)=CH₂ | -MAC |

| 3) Bonding Group —Zₙ— | Symbol |
|---|---|
| —CₙH₂n— | n |
| —COO— | E |
| —CH=CH— | V |
| —CH=CHO— | VO |
| —OCH=CH— | OV |
| —CH₂O— | 1O |
| —OCH₂— | O1 |

| 4) Ring Structure —Aₙ— | Symbol |
|---|---|
|  | H |
|  | B |
| 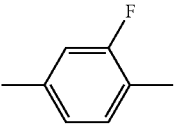 | B(F) |
| 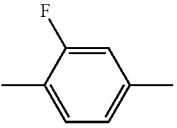 | B(2F) |
| 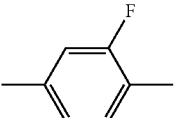 | B(F,F) |
| 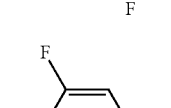 | B(2F,5F) |
| 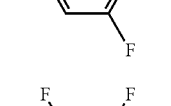 | B(2F,3F) |
| 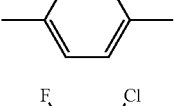 | B(2F,3CL) |
| 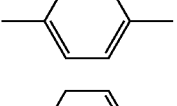 | ch |
| 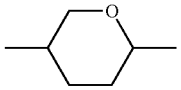 | dh |
| 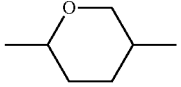 | Dh |
| 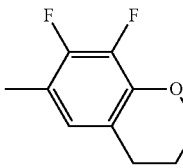 | Cro(7F,8F) |

5) Examples of Description

Example 1. 3-HHB-OCF2VFF

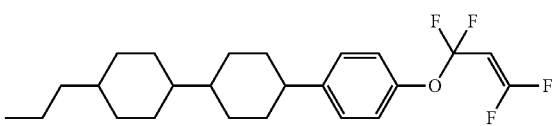 [SMILES: CCCC1CCC(C2CCC(c3ccc(OC(F)(F)C=C(F)F)cc3)CC2)CC1]

Example 2. 3-HDhB(2F,3F)-O2

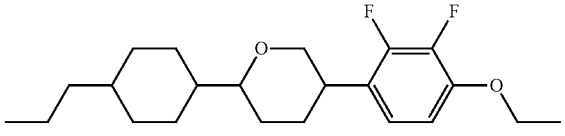 [SMILES: CCCC1CCC(C2CCC(c3ccc(OCC)c(F)c3F)CO2)CC1]

Example 3. V-HHB-1

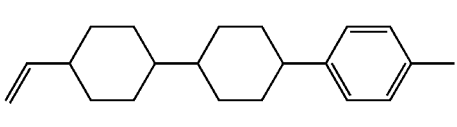

Example 4. MAC-BB-MAC

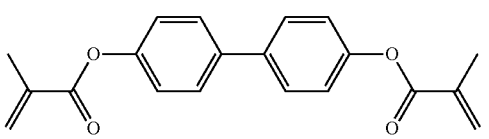 [SMILES: C=C(C)C(=O)Oc1ccc(-c2ccc(OC(=O)C(=C)C)cc2)cc1]

Example 1

| | | |
|---|---|---|
| 3-HHB-OCF2VFF | (1-3) | 13% |
| 3-HB(2F,3F)-O2 | (2-1) | 12% |
| 3-BB(2F,3F)-O2 | (2-4) | 7% |
| 2-HHB(2F,3F)-O2 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HDhB(2F,3F)-O2 | (2-16) | 9% |
| 3-HH-V | (3-1) | 30% |

NI=79.5° C.; $T_c$<−20° C.; Δn=0.109; Δε=−2.9; Vth=2.30 V; γ1=62.8 mPa·s.

Comparative Example 1

The composition in Example 1 contains compound (1) being a first component. For comparison, a composition in which a compound being a first component in Example 1 was replaced by a compound similar to compound (1) was taken as Comparative Example 1.

| | | |
|---|---|---|
| 3-HHB-OCF3 | similar to (1) | 13% |
| 3-HB(2F,3F)-O2 | (2-1) | 12% |
| 3-BB(2F,3F)-O2 | (2-4) | 7% |
| 2-HHB(2F,3F)-O2 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HDhB(2F,3F)-O2 | (2-16) | 9% |
| 3-HH-V | (3-1) | 30% |

NI=75.6° C.; $T_c$<−20° C.; $\Delta n$=0.106; $\Delta\epsilon$=−2.9; Vth=2.30 V; $\gamma 1$=70.0 mPa·s.

Example 2

| | | |
|---|---|---|
| 3-HHB-OCF2VFF | (1-3) | 6% |
| 3-HB(2F,3F)-O2 | (2-1) | 12% |
| 3-BB(2F,3F)-O2 | (2-4) | 7% |
| 2-HHB(2F,3F)-O2 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HDhB(2F,3F)-O2 | (2-16) | 9% |
| 3-HH-V | (3-1) | 30% |
| 3-HH-V1 | (3-1) | 7% |

NI=75.0° C. $T_c$<−20° C.; $\Delta n$=0.106; $\Delta\epsilon$=−3.0; Vth=2.29 V; $\gamma 1$=54.5 mPa·s.

Example 3

| | | |
|---|---|---|
| 3-HBB-OCF2VFF | (1-4) | 10% |
| 2-H1OB(2F,3F)-O2 | (2-3) | 8% |
| 3-H1OB(2F,3F)-O2 | (2-3) | 11% |
| 2-HH1OB(2F,3F)-O2 | (2-8) | 5% |
| 3-HH1OB(2F,3F)-O2 | (2-8) | 10% |
| 2-HBB(2F,3F)-O2 | (2-10) | 5% |
| 3-HBB(2F,3F)-O2 | (2-10) | 9% |
| 2-HH-3 | (3-1) | 17% |
| 3-HH-4 | (3-1) | 8% |
| 1-BB-3 | (3-3) | 4% |
| 1-BB-5 | (3-3) | 3% |
| 3-HHB-1 | (3-5) | 6% |
| 5-B(F)BB-2 | (3-7) | 4% |

NI=79.3° C.; $T_c$<−20° C.; $\Delta n$=0.104; $\Delta\epsilon$=−3.2; Vth=2.18 V.

Example 4

| | | |
|---|---|---|
| 3-HHB-OCF2V | (1-3) | 6% |
| 3-HB(2F,3F)-O2 | (2-1) | 12% |
| 3-BB(2F,3F)-O2 | (2-4) | 7% |
| 2-HHB(2F,3F)-O2 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HDhB(2F,3F)-O2 | (2-16) | 9% |
| 3-HH-V | (3-1) | 30% |
| 3-HH-V1 | (3-1) | 7% |

NI=75.0° C.; $T_c$<−20° C.; $\Delta n$=0.106; $\Delta\epsilon$=−3.0; Vth=2.27 V; $\gamma 1$=54.5 mPa·s.

Example 5

| | | |
|---|---|---|
| V-HHB-OCF2VFF | (1-3) | 6% |
| 3-HB(2F,3F)-O2 | (2-1) | 12% |
| 3-BB(2F,3F)-O2 | (2-4) | 7% |
| 2-HHB(2F,3F)-O2 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HDhB(2F,3F)-O2 | (2-16) | 9% |
| 3-HH-V | (3-1) | 30% |
| 3-HH-V1 | (3-1) | 7% |

NI=73.8° C.; $T_c$<−20° C.; $\Delta n$=0.107; $\Delta\epsilon$=−2.8; Vth=2.23 V; $\gamma 1$=49.6 mPa·s.

Example 6

| | | |
|---|---|---|
| 2-HB-OCF2VFF | (1-1) | 5% |
| 2-HHB-OCF2VFF | (1-3) | 4% |
| 3-HHB-OCF2VFF | (1-3) | 5% |
| 5-HB(2F,3F)-O2 | (2-1) | 5% |
| V-HB(2F,3F)-O2 | (2-1) | 5% |
| 2-HHB(2F,3F)-O2 | (2-6) | 4% |
| 2-BB(2F,3F)B-3 | (2-9) | 8% |
| 2-HBB(2F,3F)-O2 | (2-10) | 5% |
| 3-HBB(2F,3F)-O2 | (2-10) | 10% |
| 5-HDhB(2F,3F)-O2 | (2-16) | 5% |
| V-HDhB(2F,3F)-O2 | (2-16) | 6% |
| 3-HH-V | (3-1) | 28% |
| 3-HH-V1 | (3-1) | 7% |
| 5-B(F)BB-2 | (3-7) | 3% |

NI=73.6° C.; $T_c$<−20° C.; $\Delta n$=0.103; $\Delta\epsilon$=−2.5; Vth=2.40 V; $\gamma 1$=49.7 mPa·s.

Example 7

| | | |
|---|---|---|
| 2-HHB-OCF2VFF | (1-3) | 4% |
| 3-HHB-OCF2VFF | (1-3) | 5% |
| 5-HHB-OCF2VFF | (1-3) | 4% |
| V-HHB-OCF2VFF | (1-3) | 5% |
| 2-H1OB(2F,3F)-O2 | (2-3) | 4% |
| 3-H1OB(2F,3F)-O2 | (2-3) | 3% |
| V-H1OB(2F,3F)-O2 | (2-3) | 4% |
| 3-HHB(2F,3F)-O2 | (2-6) | 4% |
| 2-BB(2F,3F)B-3 | (2-9) | 8% |
| 2-HBB(2F,3F)-O2 | (2-10) | 5% |
| 3-HBB(2F,3F)-O2 | (2-10) | 6% |
| 3-HH1OCro(7F,8F)-5 | (2-15) | 3% |
| V-dhBB(2F,3F)-O2 | (2-17) | 3% |
| V2-dhBB(2F,3F)-O2 | (2-17) | 2% |
| 3-HH-V | (3-1) | 15% |
| 4-HH-V | (3-1) | 8% |
| 3-HH-V1 | (3-1) | 5% |
| V2-BB-1 | (3-3) | 5% |
| 3-HBB-2 | (3-6) | 4% |
| 1-B2BB-2V | (3-9) | 3% |

NI=75.2° C.; $T_c$<-20° C.; Δn=0.113; Δε=-2.5; Vth=2.39 V; γ1=43.3 mPa·s.

Example 8

| | | |
|---|---|---|
| 3-HHB-OCF2V | (1-3) | 5% |
| 5-HHB-OCF2V | (1-3) | 5% |
| 3-HBB-OCF2VFF | (1-4) | 5% |
| 3-HB(2F,3F)-O2 | (2-1) | 8% |
| 5-HHB(2F,3F)-O2 | (2-6) | 4% |
| V-HH2B(2F,3F)-O2 | (2-7) | 3% |
| 2-HH1OB(2F,3F)-O2 | (2-8) | 3% |
| 3-HH1OB(2F,3F)-O2 | (2-8) | 9% |
| 2-HBB(2F,3F)-O2 | (2-10) | 5% |
| 3-HBB(2F,3F)-O2 | (2-10) | 9% |
| 3-chB(2F,3F)-O2 | (2-18) | 3% |
| V-chB(2F,3F)-O2 | (2-18) | 3% |
| 3-HH-V | (3-1) | 20% |
| 5-HH-V | (3-1) | 12% |
| 1V2-BB-1 | (3-3) | 3% |
| 5-HBB(F)B-2 | (3-13) | 3% |

NI=80.6° C.; $T_c$<-20° C.; Δn=0.103; Δε=-3.0; Vth=2.29 V; γ1=46.8 mPa·s.

Example 9

| | | |
|---|---|---|
| 3-HBB-OCF2VFF | (1-4) | 6% |
| 5-HBB-OCF2VFF | (1-4) | 6% |
| 3-HB(2F,3F)-O2 | (2-1) | 10% |
| 5-BB(2F,3F)-O2 | (2-4) | 5% |
| V2-BB(2F,3F)-O2 | (2-4) | 5% |
| V-HHB(2F,3F)-O1 | (2-6) | 4% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HchB(2F,3F)-O2 | (2-19) | 4% |
| 3-HH-V | (3-1) | 20% |
| 3-HH-V1 | (3-1) | 9% |
| 5-B(F)BB-3 | (3-7) | 3% |
| 3-BB(F)B-5 | (3-8) | 3% |

NI=71.1° C.; $T_c$<-20° C.; Δn=0.135; Δε=-2.7; Vth=2.25 V; γ1=52.8 mPa·s.

Example 10

| | | |
|---|---|---|
| 2-HHB-OCF2VFF | (1-3) | 3% |
| 3-HHB-OCF2VFF | (1-3) | 3% |
| 5-HHB-OCF2VFF | (1-3) | 4% |
| 3-BB(F)B-OCF2VFF | (1-5) | 3% |
| 5-BB(F)B-OCF2VFF | (1-5) | 4% |
| 3-HB(2F,3F)-O2 | (2-1) | 10% |
| 3-BB(2F,3F)-O2 | (2-4) | 7% |
| V-HHB(2F,3F)-O2 | (2-6) | 7% |
| 2-BB(2F,3F)B-3 | (2-9) | 6% |
| 3-HBB(2F,3F)-O2 | (2-10) | 4% |
| 5-HBB(2F,3F)-O2 | (2-10) | 8% |
| 3-BB(2F)B(2F,3F)-O2 | (2-20) | 3% |
| 3-HH-V | (3-1) | 22% |
| 3-HH-V1 | (3-1) | 6% |
| 3-HHB-O1 | (3-5) | 3% |
| V-HHB-1 | (3-5) | 3% |
| 5-HB(F)BH-5 | (3-12) | 4% |

NI=81.6° C.; $T_c$<-20° C.; Δn=0.119; Δε=-2.5; Vth=2.42 V; γ1=50.4 mPa·s.

Example 11

| | | |
|---|---|---|
| 3-HB-OCF2VFF | (1-1) | 3% |
| 5-HHB-OCF2VFF | (1-3) | 4% |
| 3-HBB-OCF2VFF | (1-4) | 4% |
| 5-HBB-OCF2VFF | (1-4) | 4% |
| 3-HB(2F,3F)-O2 | (2-1) | 12% |
| 2-HHB(2F,3F)-O2 | (2-6) | 4% |
| 3-HHB(2F,3F)-O2 | (2-6) | 3% |
| V-HHB(2F,3F)-O4 | (2-6) | 3% |
| V2-HHB(2F,3F)-O2 | (2-6) | 3% |
| 2-BB(2F,3F)B-4 | (2-9) | 3% |
| 2-HBB(2F,3F)-O2 | (2-10) | 5% |
| 3-HBB(2F,3F)-O2 | (2-10) | 10% |
| 5-BB(2F)B(2F,3F)-O2 | (2-20) | 3% |
| 3-HH-V | (3-1) | 24% |
| 3-HH-V1 | (3-1) | 6% |
| 3-HB-O2 | (3-2) | 3% |
| V-HBB-2 | (3-6) | 3% |
| 2-BB(F)B-3 | (3-8) | 3% |

NI=74.7° C.; $T_c$<-20° C.; Δn=0.114; Δε=-2.5; Vth=2.39 V; γ1=42.4 mPa·s.

Example 12

| | | |
|---|---|---|
| 2-HHB-OCF2VFF | (1-3) | 5% |
| 3-HHB-OCF2VFF | (1-3) | 5% |
| V-HHB-OCF2VFF | (1-3) | 6% |
| 5-HB(2F,3F)-O2 | (2-1) | 8% |
| V-HB(2F,3F)-O2 | (2-1) | 4% |
| 3-BB(2F,3F)-O2 | (2-4) | 7% |
| V-HHB(2F,3F)-O2 | (2-6) | 5% |
| 2-BB(2F,3F)B-3 | (2-9) | 5% |
| 2-HBB(2F,3F)-O2 | (2-10) | 5% |
| 3-HBB(2F,3F)-O2 | (2-10) | 9% |
| 3-BB(F)B(2F,3F)-O2 | (2-21) | 3% |
| 3-HH-V | (3-1) | 20% |
| 4-HH-V | (3-1) | 7% |
| 3-HHEH-3 | (3-4) | 3% |
| V2-B2BB-1 | (3-9) | 5% |
| 5-HB(F)BH-5 | (3-12) | 3% |

NI=75.0° C.; $T_c$<-20° C.; Δn=0.113; Δε=-2.5; Vth=2.38 V; γ1=54.7 mPa·s.

Example 13

| | | |
|---|---|---|
| 3-HHB-OCF2VFF | (1-3) | 3% |
| 3-HHB-OCF2VFF | (1-3) | 6% |
| 2-H1OB(2F,3F)-O2 | (2-3) | 7% |
| 3-H1OB(2F,3F)-O2 | (2-3) | 11% |
| 3-HH2B(2F,3F)-O2 | (2-7) | 5% |
| 5-HH2B(2F,3F)-O2 | (2-7) | 6% |
| 3-HH1OB(2F,3F)-O2 | (2-8) | 3% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 2-HH-3 | (3-1) | 6% |
| 3-HH-V | (3-1) | 15% |
| 3-HH-V1 | (3-1) | 7% |
| 3-HH-VFF | (3-1) | 3% |
| VFF-HHB-1 | (3-5) | 3% |

NI=71.6° C.; $T_c$<-20° C.; Δn=0.102; Δε=-3.3; Vth=2.17 V; γ1=53.3 mPa·s.

Example 14

| | | |
|---|---|---|
| 3-HHB-OCF2VFF | (1-3) | 3% |
| 5-HHB-OCF2V | (1-3) | 6% |
| 3-HB(2F,3F)-O2 | (2-1) | 12% |
| 3-BB(2F,3F)-O2 | (2-4) | 7% |
| 5-HH2B(2F,3F)-O2 | (2-7) | 6% |
| 2-BB(2F,3F)B-3 | (2-9) | 10% |
| 2-HBB(2F,3F)-O2 | (2-10) | 5% |
| 3-HBB(2F,3F)-O2 | (2-10) | 7% |
| 5-HchB(2F,3F)-O2 | (2-19) | 3% |
| V-HchB(2F,3F)-O2 | (2-19) | 3% |
| 2-HH-3 | (3-1) | 18% |
| 3-HH-4 | (3-1) | 7% |
| 7-HB-1 | (3-2) | 5% |
| 2-BB(F)B-5 | (3-8) | 3% |
| 5-HBB(F)B-3 | (3-13) | 2% |
| 1O1-HBBH-3 | (—) | 3% |

NI=72.6° C.; $T_c$<-20° C.; Δn=0.114; Δε=-2.5; Vth=2.42 V; γ1=57.7 mPa·s.

Example 15

| | | |
|---|---|---|
| V-HHB-OCF2VFF | (1-3) | 3% |
| 3-HBB-OCF2VFF | (1-4) | 3% |
| 5-HBB-OCF2VFF | (1-4) | 3% |
| 3-HB(2F,3F)-O2 | (2-1) | 10% |
| 3-BB(2F,3F)-O2 | (2-4) | 5% |
| 1V2-BB(2F,3F)-O2 | (2-4) | 6% |
| 5-HH2B(2F,3F)-O2 | (2-7) | 9% |
| 2-BB(2F,3F)B-3 | (2-9) | 8% |
| 2-HBB(2F,3F)-O2 | (2-10) | 5% |
| 3-H1OCro(7F,8F)-5 | (2-14) | 3% |
| 3-dhBB(2F,3F)-O2 | (2-17) | 3% |
| 5-dhBB(2F,3F)-O2 | (2-17) | 3% |
| 3-HH-V | (3-1) | 16% |
| 3-HH-V1 | (3-1) | 6% |
| 3-HH-2V1 | (3-1) | 8% |
| V-HHB-1 | (3-5) | 5% |
| V2-HHB-1 | (3-5) | 4% |

NI=71.4° C.; $T_c$<-20° C.; Δn=0.116; Δε=-2.5; Vth=2.43 V; γ1=48.2 mPa·s.

Example 16

| | | |
|---|---|---|
| V-HHB-OCF2VFF | (1-3) | 10% |
| 5-HBB-OCF2VFF | (1-4) | 3% |
| 3-HB(2F,3F)-O2 | (2-1) | 12% |
| 3-BB(2F,3F)-O2 | (2-4) | 7% |
| 5-B(2F,3F)B(2F,3F)-O2 | (2-5) | 2% |
| 2-HHB(2F,3F)-O2 | (2-6) | 5% |
| 2-HBB(2F,3F)-O2 | (2-10) | 5% |
| 3-HBB(2F,3F)-O2 | (2-10) | 7% |
| 5-HBB(2F,3F)-O2 | (2-10) | 5% |
| 5-H1OCro(7F,8F)-5 | (2-14) | 3% |
| 3-HDhB(2F,3F)-O2 | (2-16) | 3% |
| 3-HH-V | (3-1) | 22% |
| 3-HH-V1 | (3-1) | 9% |
| 5-HB-O2 | (3-2) | 3% |
| 3-HHEBH-3 | (3-11) | 4% |

NI=73.6° C.; $T_c$<-20° C.; Δn=0.098; Δε=-2.9; Vth=2.28 V; γ1=58.4 mPa·s.

Example 17

| | | |
|---|---|---|
| 3-HHB-OCF2VFF | (1-3) | 6% |
| 5-HHB-OCF2VFF | (1-3) | 5% |
| 3-HBB-OCF2VFF | (1-4) | 6% |
| 3-HB(2F,3F)-O2 | (2-1) | 12% |
| 3-BB(2F,3F)-O2 | (2-4) | 7% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| 3-HBB(2F,3CL)-O2 | (2-13) | 4% |
| 3-HBB(2F,3CL)-O2 | (2-13) | 3% |
| 3-HH-V | (3-1) | 29% |
| V-HBB-3 | (3-6) | 3% |

NI=70.7° C.; $T_c$<-20° C.; Δn=0.122; Δε=-2.6; Vth=2.26 V; γ1=51.3 mPa·s.

Example 18

| | | |
|---|---|---|
| 3-HB-OCF2VFF | (1-1) | 3% |
| 5-HB-OCF2VFF | (1-1) | 4% |
| 3-HHB-OCF2VFF | (1-3) | 5% |
| 5-HHB-OCF2VFF | (1-3) | 4% |
| 3-HB(2F,3F)-O2 | (2-1) | 6% |
| 2-H1OB(2F,3F)-O2 | (2-3) | 3% |
| 3-H1OB(2F,3F)-O2 | (2-3) | 3% |
| V2-BB(2F,3F)-O2 | (2-4) | 5% |
| 1V2-BB(2F,3F)-O2 | (2-4) | 4% |
| 2-BB(2F,3F)B-3 | (2-9) | 4% |
| 2-HBB(2F,3F)-O2 | (2-10) | 5% |
| 3-HBB(2F,3F)-O2 | (2-10) | 9% |
| 3-HHB(2F,3CL)-O2 | (2-12) | 3% |
| V-HHB(2F,3CL)-O2 | (2-12) | 3% |
| 3-HH-V | (3-1) | 29% |
| 3-HHEBH-3 | (3-11) | 3% |
| 3-HHEBH-4 | (3-11) | 4% |
| 3-HHEBH-5 | (3-11) | 3% |

NI=76.3° C.; $T_c$<-20° C.; Δn=0.099; Δε=-2.6; Vth=2.26 V; γ1=47.8 mPa·s.

Example 19

| | | |
|---|---|---|
| 3-HHB-OCF2V | (1-3) | 5% |
| 3-HBB-OCF2VFF | (1-4) | 10% |
| 3-HB(2F,3F)-O2 | (2-1) | 10% |
| 3-BB(2F,3F)-O2 | (2-4) | 7% |
| 1V-HH1OB(2F,3F)-O2 | (2-8) | 3% |
| 2-BB(2F,3F)B-3 | (2-9) | 8% |
| 2-HBB(2F,3F)-O2 | (2-10) | 5% |
| 3-HBB(2F,3F)-O2 | (2-10) | 10% |
| 3-HEB(2F,3F)B(2F,3F)-O2 | (2-11) | 3% |
| 3-HH-V | (3-1) | 27% |
| 3-HH-V1 | (3-1) | 6% |
| 3-HHB-3 | (3-5) | 3% |
| 3-HB(F)HH-5 | (3-10) | 3% |

NI=76.2° C.; $T_c$<-20° C.; Δn=0.118; Δε=-2.5; Vth=2.42 V; γ1=42.1 mPa·s.

Example 20

| | | |
|---|---|---|
| 3-HHB-OCF2VFF | (1-3) | 5% |
| 5-HBB-OCF2VFF | (1-4) | 3% |
| 3-H2B(2F,3F)-O2 | (2-2) | 3% |

-continued

| | | |
|---|---|---|
| 5-H2B(2F,3F)-O2 | (2-2) | 4% |
| 3-BB(2F,3F)-O2 | (2-4) | 7% |
| 1V-HH1OB(2F,3F)-O2 | (2-8) | 9% |
| 2-BB(2F,3F)B-3 | (2-9) | 10% |
| 2-HBB(2F,3F)-O2 | (2-10) | 5% |
| 3-HBB(2F,3F)-O2 | (2-10) | 10% |
| V-HBB(2F,3F)-O2 | (2-10) | 3% |
| V-HBB(2F,3F)-O4 | (2-10) | 4% |
| 3-HH-V | (3-1) | 27% |
| 3-HH-V1 | (3-1) | 10% |

NI=74.8° C.; $T_c$<−20° C.; Δn=0.117; Δε=−3.0; Vth=2.25 V; γ1=41.9 mPa·s.

The composition in Example 1 had a smaller rotational viscosity in comparison with the composition containing a similar compound in Comparative Example 1. Accordingly, the liquid crystal composition according to the invention is concluded to have superb characteristics.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or has a suitable balance regarding at least two of the characteristics. A liquid crystal display device including the composition has characteristics such as a short response time, a large voltage holding ratio, a low threshold voltage, a large contrast ratio, a long service life and so forth, and thus can be used for a liquid crystal projector, a liquid crystal television and so forth.

What is claimed is:

1. A liquid crystal composition that has a negative dielectric anisotropy, and contains at least one compound selected from the group of compounds represented by formula (1) as a first component:

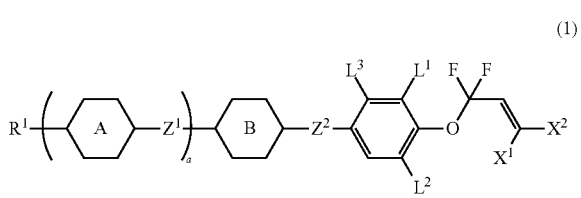

(1)

wherein, in formula (1), $R^1$ is alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring A and ring B are independently 1,4-cyclohexylene, 1,4-cyclohexenylene, 1,4-phenylene or 1,4-phenylene in which at least one piece of hydrogen is replaced by fluorine or chlorine, tetrahydropyran-2,5-diyl, 1,3-dioxane-2,5-diyl, pyrimidine-2,5-diyl, or pyridine-2,5-diyl; $Z^1$ and $Z^2$ are independently a single bond, —CH2CH2—, —C≡C—, —CH═CH—, —CF═CF—, —CF$_2$O—, —OCF$_2$—, —CH$_2$O—, —OCH$_2$—, —COO— or —OCO—; $L^1$, $L^2$ and $L^3$ are independently hydrogen, fluorine or chlorine; $X^1$ and $X^2$ are independently hydrogen or fluorine; and a is 0, 1, 2 or 3.

2. The liquid crystal composition according to claim 1, containing at least one compound selected from the group of compounds represented by formulas (1-1) to (1-8) as the first component:

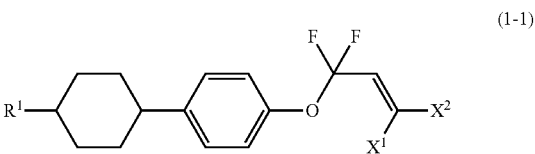

(1-1)

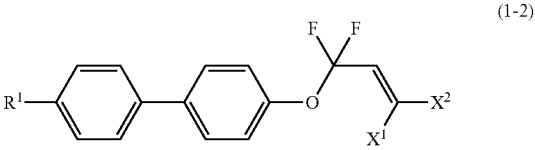

(1-2)

(1-3)

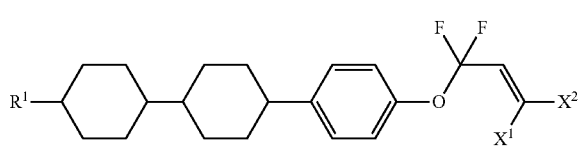

(1-4)

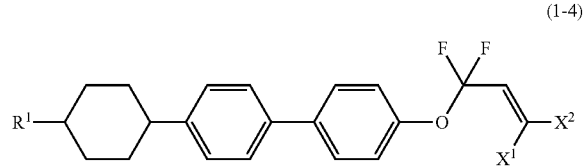

(1-5)

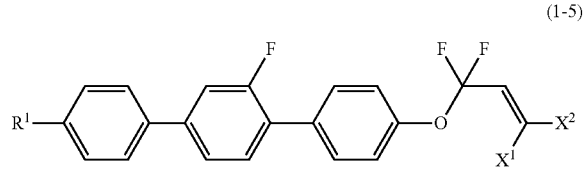

(1-6)

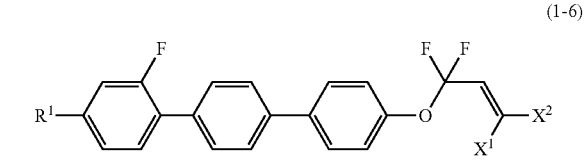

(1-7)

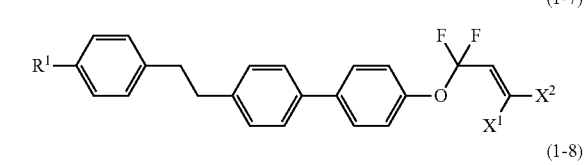

(1-8)

wherein, in formula (1-1) to formula (1-8), $R^1$ is alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; and $X^1$ and $X^2$ are independently hydrogen or fluorine.

3. The liquid crystal composition according to claim 1, wherein a proportion of the first component is in the range of 3% by weight to 30% by weight based on the weight of the liquid crystal composition.

4. The liquid crystal composition according to claim 1, containing at least one compound selected from the group of compounds represented by formula (2) as a second component:

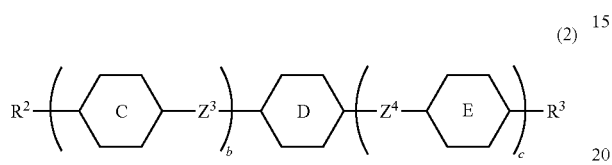

(2)

wherein, in formula (2), $R^2$ and $R^3$ are independently alkyl having 1 to 12 carbons, alkoxy having 1 to 12 carbons, alkenyl having 2 to 12 carbons, or alkenyloxy having 2 to 12 carbons; ring C and ring E are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; b is 1, 2 or 3; c is 0 or 1; and a sum of b and c is 3 or less.

5. The liquid crystal composition according to claim 4, containing at least one compound selected from the group of compounds represented by formulas (2-1) to (2-21) as the second component:

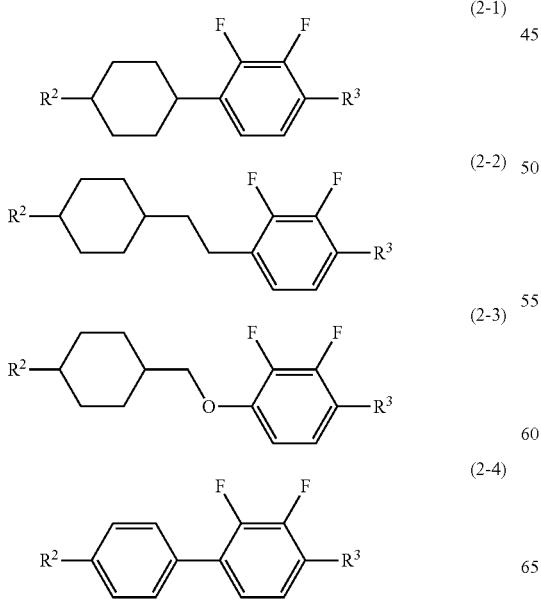

(2-1)

(2-2)

(2-3)

(2-4)

-continued

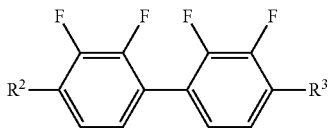

(2-5)

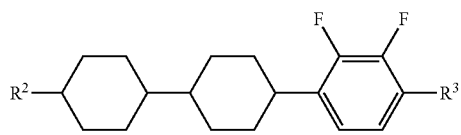

(2-6)

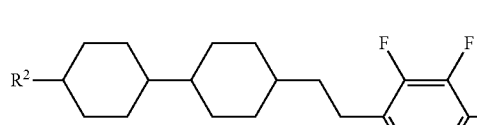

(2-7)

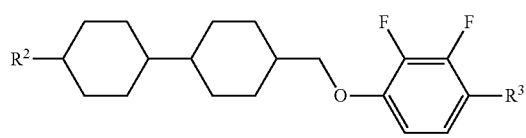

(2-8)

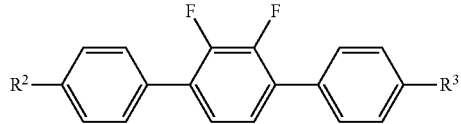

(2-9)

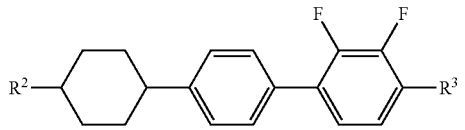

(2-10)

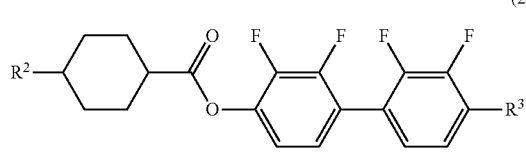

(2-11)

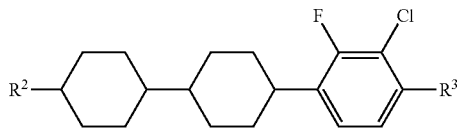

(2-12)

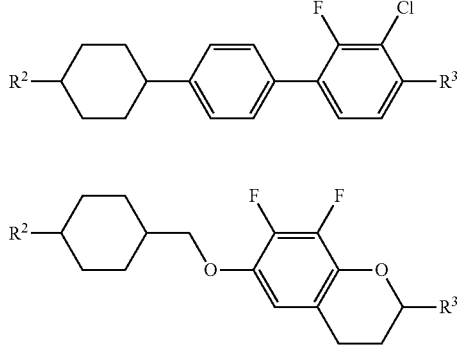

(2-13)

(2-14)

-continued

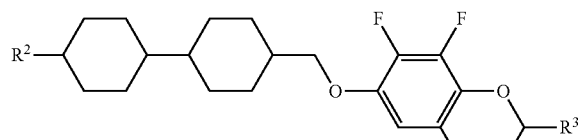
(2-15)

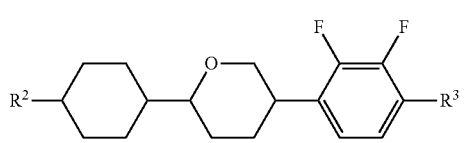
(2-16)

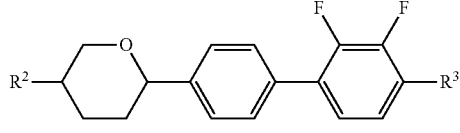
(2-17)

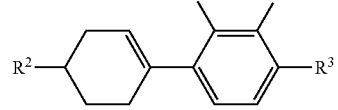
(2-18)

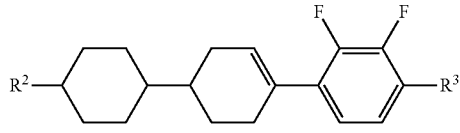
(2-19)

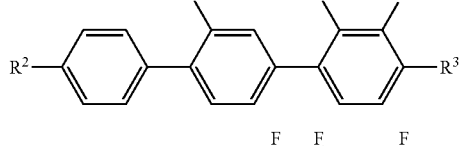
(2-20)

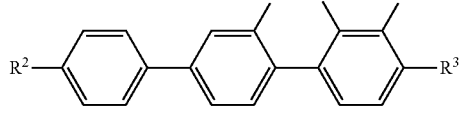
(2-21)

wherein, in formula (2-1) to formula (2-21), $R^2$ and $R^3$ are independently alkyl having 1 to 12 carbons, alkoxy having 1 to 12 carbons, alkenyl having 2 to 12 carbons, or alkenyloxy having 2 to 12 carbons.

6. The liquid crystal composition according to claim 4, wherein a proportion of the second component is in the range of 10% by weight to 90% by weight based on the weight of the liquid crystal composition.

7. The liquid crystal composition according to claim 1, containing at least one compound selected from the group of compounds represented by formula (3) as a third component:

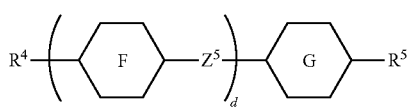
(3)

wherein, in formula (3), $R^1$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring F and ring G are independently 1,4-cyclohexylene, 1,4-phenylene, 2-fluoro-1,4-phenylene, or 2,5-difluoro-1,4-phenylene; $Z^5$ is a single bond, ethylene, carbonyloxy or methyleneoxy; and d is 1, 2 or 3.

8. The liquid crystal composition according to claim 7, containing at least one compound selected from the group of compounds represented by formulas (3-1) to (3-13) as the third component:

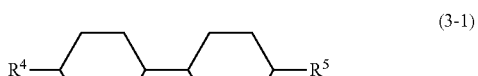
(3-1)

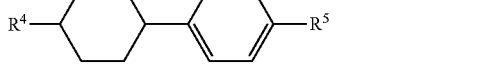
(3-2)

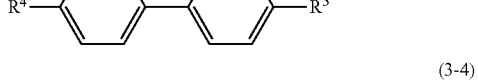
(3-3)

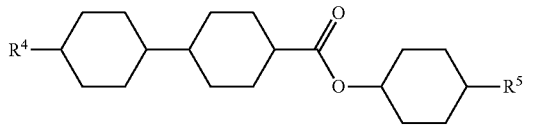
(3-4)

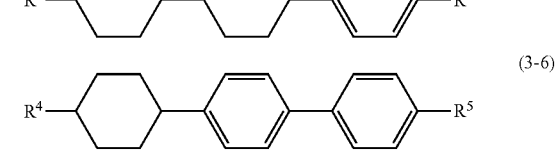
(3-5)

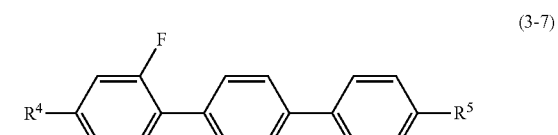
(3-6)

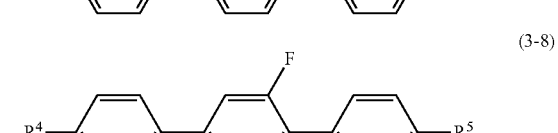
(3-7)

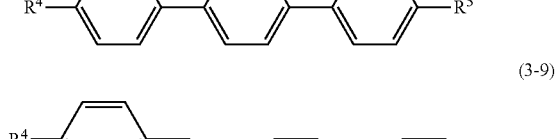
(3-8)

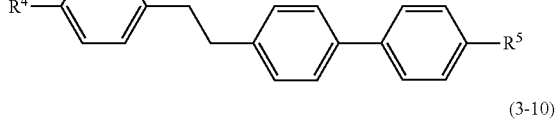
(3-9)

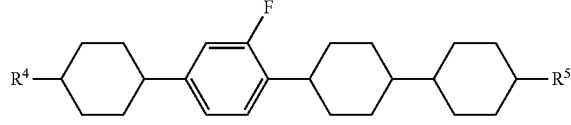
(3-10)

-continued (3-11)
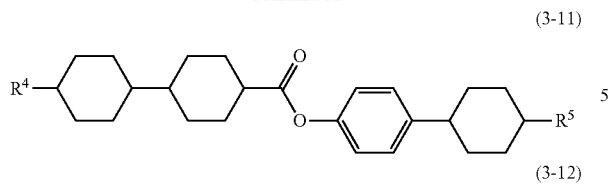

(3-12)
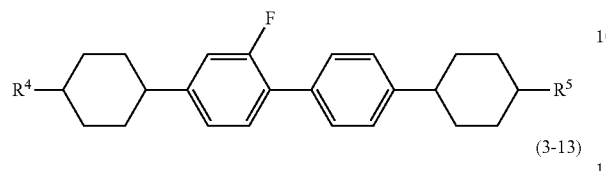

(3-13)
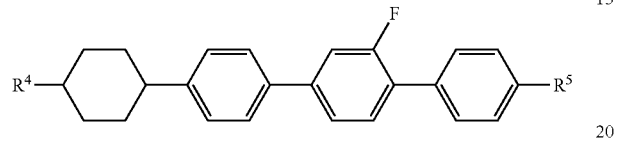

wherein, in formula (3-1) to formula (3-13), $R^4$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

9. The liquid crystal composition according to claim 7, wherein a proportion of the third component is in the range of 20% by weight to 70% by weight based on the weight of the liquid crystal composition.

10. The liquid crystal composition according to claim 4, containing at least one compound selected from the group of compounds represented by formula (3) as a third component:

(3)
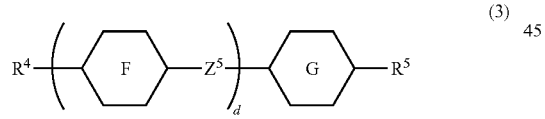

wherein, in formula (3), $R^4$ and $R^5$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring F and ring G are independently 1,4-cyclohexylene, 1,4-phenylene, 2-fluoro-1,4-phenylene, or 2,5-difluoro-1,4-phenylene; $Z^5$ is a single bond, ethylene, carbonyloxy or methyleneoxy; and d is 1, 2 or 3.

11. The liquid crystal composition according to claim 1, containing at least one polymerizable compound selected from the group of compounds represented by formula (4) as an additive component:

(4)
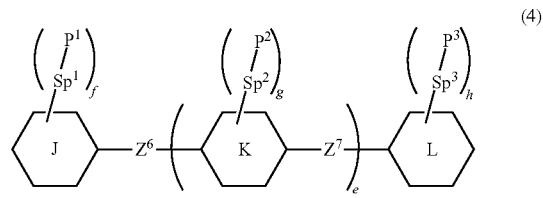

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen maybe replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$—may be replaced by —CH=CH— or —CC—, and in the groups, at least one piece of hydrogen may be replaced by fluorine or chlorine; e is 0, 1 or 2; f, g and h are independently 0, 1, 2, 3 or 4; and a sum of f, g and h is 1 or more.

12. The liquid crystal composition according to claim 11, wherein, in formula (4), $P^1$, $P^2$ and $P^3$ are independently a polymerizable group selected from the group of groups represented by formulas (P-1) to (P-6):

(P-1)
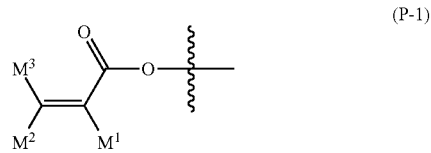

(P-2)
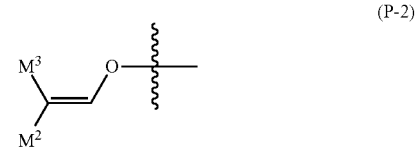

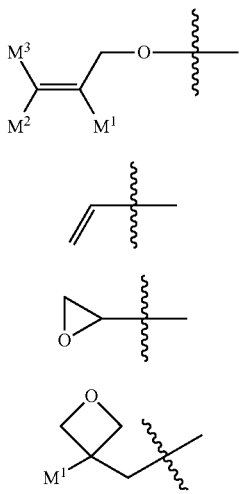

wherein, in formula (P-1) to formula (P-6), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine;

wherein, in formula (4), when all of f pieces of $P^1$ and h pieces of $P^3$ are the group represented by formula (P-4), at least one of f pieces of $Sp^1$ and h pieces of $Sp^3$ is alkylene in which at least one piece of —$CH_2$— is replaced by —O—, —COO—, —OCO— or —OCOO—.

13. The liquid crystal composition according to claim 11, containing at least one polymerizable compound selected from the group of compounds represented by formulas (4-1) to (4-27) as the additive component:

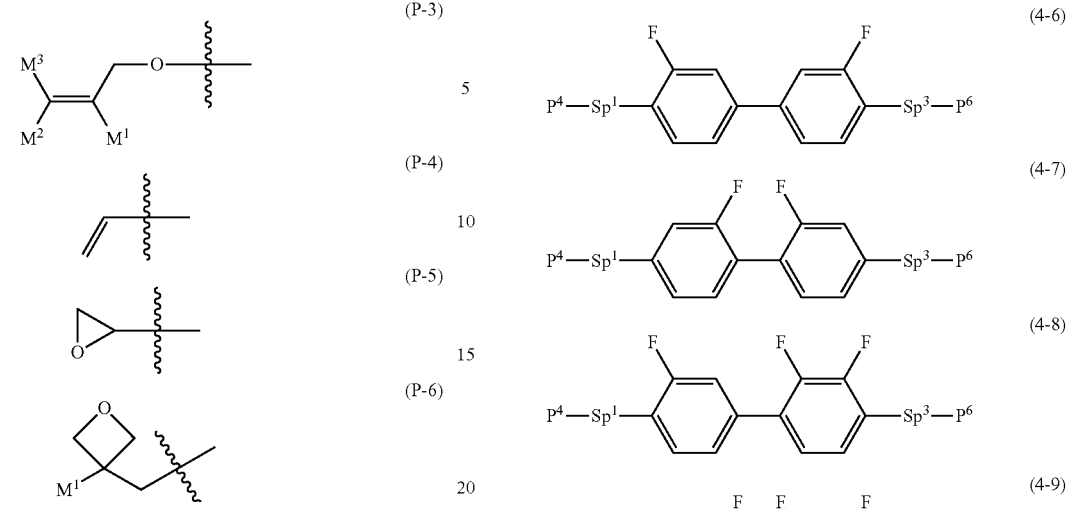

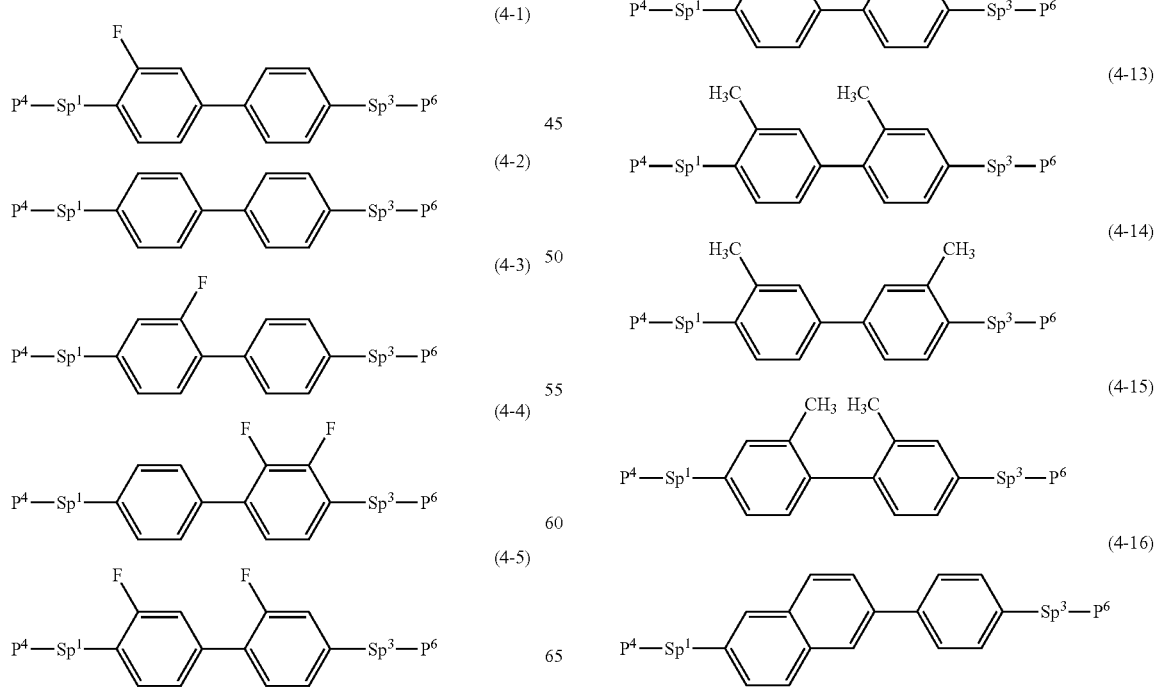

(4-17) 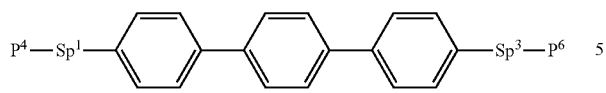

(4-18) 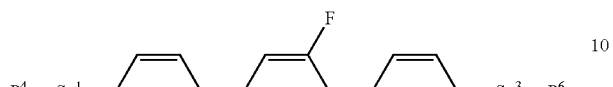

(4-19) 

(4-20) 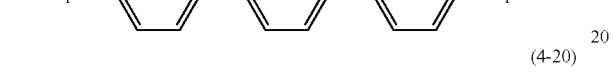

(4-21) 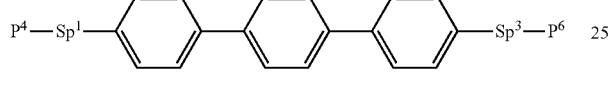

(4-22) 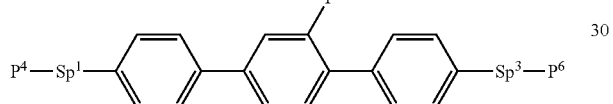

(4-23) 

(4-24) 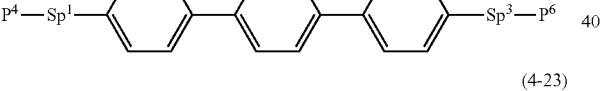

(4-25) 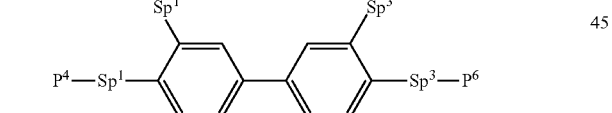

(4-26) 

(4-27) 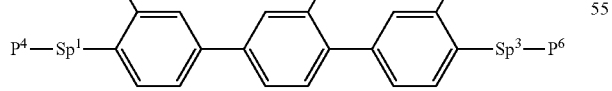

wherein, in formula (4-1) to formula (4-27), $P^4$, $P^5$ and $P^6$ are independently a polymerizable group selected from the group of groups represented by formula (P-1) to formula (P-3);

(P-1) 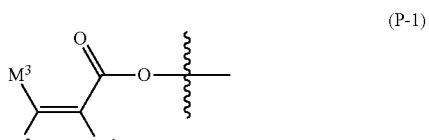

(P-2) 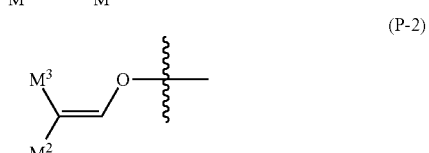

(P-3) 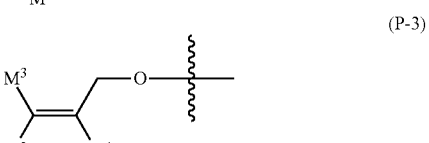

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine;

wherein, in formula (4-1) to formula (4-27), $Sp^1$, $Sp^2$ and $Sp^3$ are independently a single bond or alkylene having 1 to 10 carbons, and in the alkylene, at least one piece of —CH2— may be replaced by —O—, —COO—, —OCO— or —OCOO—, and at least one piece of —CH$_2$—CH$_2$— may be replaced by —CH═CH— or —C≡C—, and in the groups, at least one piece of hydrogen may be replaced by fluorine or chlorine.

14. The liquid crystal composition according to claim 11, wherein a proportion of addition of the additive component is in the range of 0.03% by weight to 10% by weight based on the weight of the liquid crystal composition.

15. The liquid crystal composition according to claim 10, containing at least one polymerizable compound selected from the group of compounds represented by formula (4) as an additive component:

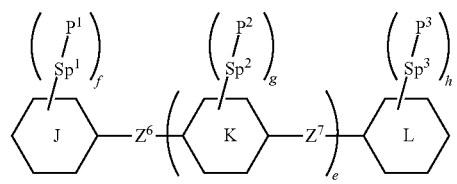
(4)

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen maybe replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1, 6-diyl, naphthalene-1, 7-diyl, naphthalene-1, 8-diyl, naphthalene-2, 3-diyl, naphthalene-2, 6-diyl, naphthalene-2, 7-diyl, tetrahydropyran-2,5-diyl, 1,3-dioxane-2,5-diyl, pyrimidine-2, 5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($H_3$)— or —C($CH_3$)=C($CH_3$) —, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$—may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; e is 0, 1 or 2; f, g and h are independently 0, 1, 2, 3 or 4; and a sum of f, g and h is 1 or more.

16. A liquid crystal display device, including the liquid crystal composition according to claim 1.

17. The liquid crystal display device according to claim 16, wherein an operating mode in the liquid crystal display device includes an IPS mode, a VA mode, an FFS mode or an FPA mode, and a driving mode in the liquid crystal display device includes an active matrix mode.

18. A polymer sustained alignment mode liquid crystal display device, wherein the liquid crystal display device includes the liquid crystal composition according to claim 11, or the polymerizable compound in the liquid crystal composition is polymerized.

* * * * *